United States Patent
Carotti et al.

(10) Patent No.: US 6,704,890 B1
(45) Date of Patent: Mar. 9, 2004

(54) SKEW COMPENSATING INTERFACE FOR OPERATION WITH ARBITRARY DATA

(75) Inventors: David Carotti, Brockenhurst (GB); Paul Wilson, Hertfordshire (GB)

(73) Assignee: Nortel Networks Limited, St. Laurent (CA)

( * ) Notice: Subject to any disclaimer, the term of this patent is extended or adjusted under 35 U.S.C. 154(b) by 483 days.

(21) Appl. No.: 09/771,802

(22) Filed: Jan. 29, 2001

Related U.S. Application Data

(63) Continuation-in-part of application No. 09/747,694, filed on Dec. 22, 2000.

(51) Int. Cl.[7] ............................................. G06F 11/00
(52) U.S. Cl. ........................................................ 714/700
(58) Field of Search .......................................... 714/700

(56) References Cited

U.S. PATENT DOCUMENTS

| | | | |
|---|---|---|---|
| 6,209,072 B1 * | 3/2001 | MacWilliams et al. ..... | 711/167 |
| 6,211,714 B1 * | 4/2001 | Jeong ........................ | 327/293 |
| 6,370,200 B1 * | 4/2002 | Takahashi ................... | 375/257 |

OTHER PUBLICATIONS

U.S. patent application Ser. No. 09/747,694 Filed Dec. 22, 2000.*

* cited by examiner

Primary Examiner—R. Stephen Dildine
(74) Attorney, Agent, or Firm—Barnes & Thornburg

(57) ABSTRACT

A technique for compensating for skew between parallel digital data bitstreams resulting from transmission over a path, not requiring the sending of a training sequence or excessive down-time, is effected by sending a parallel reference bitstream carrying a sequence of samples taken from the individual data bitstreams. It is found that correlation of the reference bitstream with the data bitstreams is sufficient to identify the skew amount. This can then be signalled or preferably corrected at the receive end or pre-corrected at the transmit end of the path. Signalling can also be superimposed by multiplexing the reference bitstream with signalling information with little or no additional overhead. This can be particularly useful to shut down a laser in an optical transmission path if a broken optical fibre is detected that would otherwise pose a health hazard to personnel.

67 Claims, 21 Drawing Sheets

Annotated Burst Samples

|  | 3 | 2 | 1 | 0 | ← data bits |
|---|---|---|---|---|---|
| −2 | 300 | 0 | 0 | 0 | |
| −1 | 0 | 0 | 0 | 0 | |
| 0 | 0 | 300 | 0 | 0 | |
| +1 | 0 | 0 | 300 | 1 | |
| +2 | 0 | 0 | 0 | 0 | |

↑ offset

*Fig. 13b*

Signalling negative
correlations
(messages)

positive
correlations
(data)

no signals
on any bits
= "no message"

*Fig 18*

SKEW COMPENSATING INTERFACE FOR OPERATION WITH ARBITRARY DATA

This a continuation in part of application Ser. No. 09/747,694, filed Dec. 22, 2000.

FIELD OF THE INVENTION

The present invention is concerned with digital data transmission and especially with systems, methods and apparatus for detecting and correcting skew in data streams transmitted over a signal path, especially from a transmitter end to a receiver end of the path. The invention also encompasses transmitters, receivers, transmission methods and reception methods, all for detecting and correcting skew in data streams for transmission over a path. The invention further comprises signals and signal paths carrying such signals.

BACKGROUND OF THE INVENTION

The present specification describes techniques and functions applicable to the implementation of a general purpose, skew compensating interface that, for convenience, has been given the acronym RAUDI ("Reference Aligned Universal Digital Interface"). RAUDI will find particular application in systems having bitstreams with data rates above 2.5G bits/second, but is applicable to any data rate where an application is otherwise compromised by any type of timing skew.

In telecommunications systems the most obvious (but not the only) application will be in the Physical Layer. The techniques used in the RAUDI enable significant functionality, specifically but not exclusively:

The interface is non-intrusive; it neither affects payload throughput nor the payload continuity even if payload flow is continuous (there is no flow control). It is thus transparent to higher level functions.

Operation is independent of the overlying payload format and application, i.e. it is format agnostic.

The features and hence complexity can be chosen and widely and flexibly distributed to suit both the application and the available implementation technologies.

Any implementation scales well with data rate, with skew magnitude, with bus width and with rate of change of skew.

The overhead associated with the skew compensation process is minimal.

These collective functions offer advantages over other, known skew compensating schemes as will become apparent.

GENERAL INTRODUCTION/BACKGROUND

Referring to FIG. 1, a schematic diagram of a digital data communication link is depicted. A transmit side or transmit interface, generically indicated at TX, inserts a plurality of bitstreams 0 to n into a transmission channel for reception at a receive side, or receive interface, generically indicated at RX. The individual bitstreams collectively define a data bus. There is significance in the relative position of the bits in the respective bitstreams forming the bus. This relative positioning needs to be preserved at the receive end RX if the received data is to be useful to the recipient. However, the data channel imposes variable delays on the bitstreams such that the data bits in the bit-streams are no longer in the same relative time/phase position as they were at the transmit end. This phenomenon is known in the art as skew. Measures have to be taken to restore the bitstreams into the same relative position that they had at the transmit end. This restoration is known in the art as skew compensation or skew correction.

All bits in a bus are notionally valid within a given window of time. The position in time of these bits with respect each other can be significant in data communications and so must be controlled if the significance is not to be lost. In a synchronous transmit/receive system, the values on each bit are sampled at fixed intervals to re-align them but if the data is sampled when the data is invalid, errors will occur.

The spread in the delay Introduced across all bits of an interface and its associated communications medium is called the overall skew of the bus. Different skews also exist between individual bits within the bus and these cannot exceed the overall skew. That part of the skew which is equal to a whole number of bit periods is defined as gross skew; the remaining skew, which is less than one bit period, is defined as the fractional skew. A simplified representation of skew is shown in FIG. 3. Throughout the present specification, the sum of the gross and fractional skew is collectively defined as skew.

Skew is not fixed and can change over time (quickly or slowly) depending on many factors, such as temperature. Since these external factors are often outside the scope of any control, they are a fundamental issue in high speed data communication.

Traditional low speed interfaces are able to transfer data words as a bus across a communications medium without introducing significant delay between individual bits. If all bits in a word can be transferred across an interface and associated communications medium such that all individual bits are correctly aligned to within 1 bit period, a conventional synchronous interface can transfer data of any format without any overall skew-induced errors. This is indicated generically in FIG. 4, where it can be seen that the system requires a common clock to control data transfer at both the transmit and the receive ends of a communication channel.

As an aid to understanding the terminology employed in the art and in the present specification it may be useful to define terms as follows:

A medium is defined as any intervening substance, including free-space, that can be used as a mechanism for conveying information. Each medium requires a driver and a receiver that is compatible with both the medium and the technology used to implement the interface.

The combination of transmit interface, medium and receive interface is defined as a channel.

A signal path can be any path or route taken by a signal in passing from one location to another. This may be a communication channel, incorporating for example an electric cable, optical fibre and so on. Alternatively, it may include a storage device which can be static, such as RAM or other software type storage, or dynamic, such as tape and disk storage media. It may also include a computer network.

Skew can be introduced by all components of the path. As data rates have increased (and will continue to increase) and, with longer interconnects, media and implementation technologies are being pushed to the limits and it is often impossible to control the channel skew to within 1 bit period without some additional scheme for skew compensation. Even short path lengths introduce skew if data rates are high.

It will not be uncommon for skews of any magnitude to be introduced across a data bus such that the significance of individual bits within a bus sampled at a single instant appears to be lost. There is thus a very real need for techniques which can in some way measure, track (and compensate for), large amounts of skew, thus re-aligning the individual bits of a data bus and fully restoring them.

Skew can be present in a system as fractional skew, gross skew or both, depending on the position in the system and the timing schemes in force. It is thus important to understand the significance of any skew at each point in a system. Two main types of system are important here; a synchronous system and a plesiochronous system. Correctly designed asynchronous systems are naturally robust to timing errors and are not considered here.

Synchronous Systems

FIG. 5 depicts a synchronous system in which data is passed between perfect re-timing elements and sampled according to a common clock that is passed to both sides of the channel. As long as the skew between data and clock at points X is less than one bit period, the system performs as anticipated the relative position of bits is maintained and the fractional skew is removed by the re-timing element (the gross skew is zero). However, if the skew at X is 1 bit period, to within the uncertainty of the re-timing element, the re-timing element can choose to sample individual bits from one bit position or the next. There is thus an uncertainty as to the required value of the data bit and a 50% chance that the wrong data bit is sampled. Since the fractional skew is subject to variation and the clock can be subject to jitter, this can cause the sampled data Y to wander between clock cycles in an uncontrolled fashion.

If all bits of the bus are around the same sampling point, it can be seen that the probability of sampling all bits correctly rapidly diminishes to zero. The performance of the system is then dominated by the skew performance of the channel and not by the rest of the system and becomes undeterministic.

Purists will recognise that this argument is incomplete, but the following rules can be deduced and hold true even if all arguments are known.

Rule 1

Where a synchronous system encompasses a channel whose overall skew is always less than 1-bit period, correct operation is attained and fractional skew is removed by the receiving timing element.

Rule 2

Where a channel having overall skew of more than 1-bit period is terminated by a synchronous interface, the system behaviour is undeterministic, even if the correct gross skew is removed from the sampled data in the receiver.

On the basis of rules 1 and 2 it can be assumed that if gross skew is present in the channel, both skew measurement and compensation are impossible in a synchronous system. FIG. 6 depicts the overall system under consideration. However, it can be deduced that if it were possible to insert skew compensation on the transmit side of the channel (as shown FIG. 6) and if it were possible to provide the skew correcting parameters at this point, then the sampling point of the timing element is not compromised and perfect data is received.

Note also that even if the skew compensation block introduces latency that contributes to the gross skew, this can also be captured in the skew compensation parameters and so removed. Furthermore, by the application of rule 1, it can be seen that the skew compensation block need only remove the gross skew from the channel, the fractional skew being removed by the receive re-timing block.

Turning now to FIG. 7, the details of how the skew compensation parameters are passed are overlayed on FIG. 6. By applying rule 1, it can be seen that the skew between re-timing stages in this path must always be less than 1 bit period. This constrains the channel skew to be less than 1 bit and so gross skew compensation is precluded. Rule 3 can be deduced as follows:

Rule 3

The maximum skew that can be removed by a synchronous skew compensating interface is the fractional skew (<1 bit). In other words, a re-timing stage is the best possible synchronous skew compensation available.

Plesiochronous

Because of the fundamental incompatibility of synchronous systems in the presence of gross skew, the use of plesiochronous systems has become widespread in high speed interfaces. Plesiochronous systems rely on the repetitive nature of a data bit to deduce the clock period associated with the data. A continuous clock of this frequency can thus be extracted and aligned with the data to allow a subsequent system (asynchronous or synchronous) to sample it correctly. At certain points in the plesiochronous system, this transition from data to clock with data is made and vice versa.

It is an artefact of a plesiochronous system that individual data bits are allowed to have completely ambiguous phase and hence skew relationships with other data bits and the only timing significance associated with the data is with its own extracted clock. There is thus no timing significance between any data bits. They can thus be regarded as permanently skewed. Since they are permanently skewed, gross skew introduced in a channel is a naturally tolerated parameter no matter how large it is.

It is thus possible to define the following rule:

Rule 4: Where a channel is terminated by a plesiochronous interface, individual data bits can be subjected to an infinite amount of skew without loss of data.

In the system depicted in FIG. 8, the source of data generates m bits which are multiplexed to n-bits at a higher rate by a serialiser and media driver for transmission over the channel. The channel introduces skew and the payload is removed in the media receiver and is demultiplexed back to the original m bits and an additional m clocks in a deserialiser.

It is however important to note that although the channel is carrying the payload correctly, the significance of the data to the applications has been lost in the presence of gross skew.

It is also an artefact of plesiochronous systems that when the data is extracted it is realigned to its own clock and so fractional skew is removed. The plesiochronous receiver also has to maintain the alignment of data and clock in the presence of jitter and changes in skew. Since this a natural artefact of the plesiochronous receiver, it is possible to define rule 5 as follows:

Rule 5: When a channel is terminated in a plesiochronous receiver, it removes the fractional skew.

By combining Rules 4 and 5 it can be seen that gross skew is the only type of additional skew compensation required when a channel is terminated at a plesiochronous interface. It is noteworthy that designs for such plesiochronous translators can themselves introduce large amounts of gross skew into the data (not just absolute delay) thereby exaggerating the timing uncertainty of any medium-introduced skew. It is for this reason, that most skew compensating schemes place the skew compensation immediately after the plesiochronous receiver.

The context in a typical system is depicted in FIG. 9. This shows the context for any skew compensating scheme and has a single location for the skew compensation blocks applicable to RAUDI or other schemes.

Basic Context of Skew Compensation

The context is shown in FIG. 9 but is not limited to any specific data transmission method. The general nature of this part of the discussion highlights the broadbased application of the invention but also allows the introduction of some of the common and scheme specific requirements for a skew compensation scheme to be introduced as the description becomes more specific.

Data is sent from the source 1 at the top of FIG. 9 and is ultimately delivered to the destination 2 at the bottom. In this illustration, the path 3 carries the plesiochronous data and introduces large amounts of gross skew. Since the channel is terminated in a plesiochronous interface 4 (rules 4 & 5) the challenge for the designer of a skew compensation scheme is to find the best method to measure, track and compensate for the gross skew while working to link integrity and implementation constraints.

In general terms, the channel skew characteristics are measured 5 and then used to create the parameters required for the skew compensation block 6. The skew compensation block thus applies the inverse skew function to the measured channel skew function. Detection of errors can be important but no specific error detection block is shown in this particular depiction. This is because not all schemes can naturally detect errors whereas RAUDI can do so within the skew compensation block. For the correct operation of a plesiochronous interface there must be sufficient numbers of transitions in the received data to allow a clock to be recovered and to align it correctly with the recovered data eye. This is widely understood by the skilled man and, where the data transition density is too low, this requirement can be met through the use of paired scramblers/descramblers in the transmit and in the receive data paths.

In the RAUDI case, the interface is data format agnostic and so does not have prior knowledge of the transition density associated with the data it is transmitting. It can thus be most important that the data is scrambled for the correct operation of the plesiochronous devices, as will be explained more fully later.

Since the plesiochronous interface is contained within the scope of the skew compensation scheme this skew can also be removed. The transition density scrambler (or another scrambler) can also be used to ensure that individual bit streams are not highly correlated (i.e. similar) to each other (e.g. where all data bits are at logic '0' for extended periods). This assists with RAUDI performance (see later) by reducing false correlations in its skew measurement scheme.

There, the key function of the plesiochronous receiver is that it tracks small changes in skew and constantly removes it. In the steady state, the gross skew rarely changes. The main impairment to this fine tracking is the rate at which changes in skew can be tracked. This is an artefact of the implementation of the plesiochronous receiver. Theoretically, a perfect receiver can always track rates of change in skew which are less than 1-bit per bit period i.e. if the data moves by less than one bit within its own period. If the rate of change in skew is within this limit, the recovered data and associated clock are dynamically realigned to track the change autonomously. The data at the output of the plesiochronous interface is thus 'bit locked' with respect to its own clock and will track and hence remove the fractional contributor to the skew. The gross skew (possibly even 100's of bits) across the whole bus is still present at the output of the medium receiver.

At the output of the plesiochronous receiver there are the recovered clock and data busses, each data stream being synchronously aligned with its own clock but with arbitrary phase between these and the other bits/clocks. It is at this point where implementers of skew compensation schemes (including RAUDI) find it convenient to operate synchronously within a single clock domain. The data is re-timed onto a single clock using a circular buffer, which an expert in implementation can make error free. The circular buffer is in essence a buffer-with separate write and read ports whose addresses are kept apart so that the re-timed data is always stable when it is read.

At the output of the circular buffer, the data has had fractional skew removed and has been re-timed onto a single clock. Up to this point most aspects of skew compensation schemes are common. In general terms these schemes all require transmit functionality, receive functionality and a medium to transfer data containing payload and signalling. Some schemes combine signalling and the payload and others keep them separate. Note that some of these schemes are intrusive and affect the payload directly in some way; others do not affect payload at all. It should thus not be assumed that the path labelled payload in the figure has continuity; some schemes periodically disrupt this path. RAUDI is totally non-invasive as it neither modifies nor interrupts the payload at any time.

Various competitive techniques for the removal of the gross skew and their relative merits and limitations will now be described in order to place the present invention and its likely impact on digital transmission in proper perspective. The RAUDI design has major advantages over other prior art schemes, including those recently specified as Industry Standards by the IEEE.

Comparison with Existing Solutions

FIG. 9 remains relevant to the subsequent discussion.
1) Sending a Training Sequence.

When a link is initialising, an expert implementer can devise a sequence of training data that is transmitted on all data bits prior to the payload. The receiving device can use knowledge of that sequence to derive the skew between individual bits and thus compensate for them.

This scheme has the following advantages:

The use of training sequences is well established in certain other applications where the medium characteristics are unknown. The use of training sequences for skew compensation is however less well established.

This approach is data agnostic.

This scheme has the following disadvantages:

While the training sequence is being sent, payload cannot also be sent. The training sequence blocks useful payload upon initialisation and on any subsequent re-training or verification of the medium characteristics. This scheme thus compromises payload continuity and throughput in systems where flow control is not available at the next layer in the hierarchy, payload will be corrupted for the duration of the training sequence, introducing errors into the payload that must be detected at higher levels of control. The interface is thus not self-contained and cannot be used in high integrity systems.

Genuine payload must not be mistaken for the training sequence to any high probability. If the content of the payload is unknown, there is always a finite probability that the payload and the training sequence will be confused, leading to communication errors.

If signalling is not to interrupt the payload, provision for a separate signalling path is also required. Skew compensation does not occur continuously; it only occurs at specific times.

In the presence of gross errors, there is no method for detecting these until the next training sequence is sent. The interface will propagate errors until then. If the frequency of training is high, this degrades payload throughput but increases the chance of early detection of errors. If the frequency of re-training is infrequent it is more likely that errors will be detected by devices that are higher in the hierarchy before the link itself detects the error. There is thus no fast detection of link failure that does not rely on other (higher) levels of control. It is also necessary to choose a re-training rate that depends on how likely errors are to occur and this may be impossible to predict as it depends on external factors. There are thus aspects of performance that depend on the environment rather than the implementation. RAUDI is distinct from the scheme as it uses the data itself to characterise the channel.

2) Adding an Overhead to the Transmission Rate.

In this scheme, incoming payload at p bits/s is transmitted over a link at a higher rate of h bits/s. This allows (h-p) bits/s of signalling to be transmitted over the link in parallel with the payload. This overhead is also used to transmit frame alignment codes which an expert implementer can use to compensate for the detected skew. An example of such an interface is the IEEE XAUI interface as used between XGXS blocks as specified in IEEE802.3ae.

This scheme has the following advantage:

Characterisation of the medium-and signalling is performed over the same number of ports as the original medium drivers/receivers and so has a zero port connection overhead.

This scheme has the following disadvantages:

All bits of medium drivers and receivers have to operate at a higher rate, making them more demanding on design (noise immunity, emc and power consumption). The extra capacity that these have is not then used to carry any additional payload.

Because a rate change is required additional references or clock generators are required to provide the new rate, adding to design complexity and implementation issues.

In the XAUI example the basic payload rate is 2.5 Gb/s and the final medium transmission rate is 3.125 Gb/s; a significant overhead.

3) Using Knowledge of the Payload to Derive Framing Information

Under this scheme the skew compensation can only work if the data contained in the payload has a known frame structure. An example of such an interface is the SUPI interface as specified in IEEE 802.3ae. In this example, the payload already contains SONET framing information that an expert implementer can use to characterise and compensate for skew.

This scheme has the following advantage:

Characterisation of the medium is performed over the same number of bits as the original medium drivers/receivers and so has a zero port connection overhead.

This scheme has the following disadvantages:

This technique cannot be used where there is no overlying frame structure in the payload (i.e. it does not work if the format of the data is totally arbitrary). The scheme does not thus lend itself to generic interfaces. This technique does not work if there is an underlying frame structure, but this is not known in advance. The interface only interacts with other devices that carry payload in the same format as that catered for, thereby making it application specific.

Because the transported payload is carried in a frame, the framing overhead erodes the payload carrying capacity of the link to below its maximum capacity.

Where the overlying frame does not already accommodate link layer signalling, this feature cannot be implemented without an additional parallel signalling path (an interface port overhead).

The maximum skew compensation that can be performed is limited by the length of the overlying frame (the longer the frame, the more skew can be compensated for). In the case of OC192 SONET for SUPI framing, the period of the frame is fixed and long. Although this provides for good skew compensation properties, the time for gross errors to be detected can be extended. Without the scope to reduce the length of the frame, this restricts the ability of the interface to quickly detect and signal link errors. The performance is thus limited by the format of the data itself rather than the chosen implementation.

4) Using a Parity Bit to Estimate the Skew.

Although no serious proposals for this type of scheme have been put up, the technique is nevertheless feasible and its features are therefore worthy of comparison against the other techniques as it has the same bit overhead as RAUDI but is impractical to use in any serious application. It is also important not to confuse this scheme with the RAUDI scheme. It is for this reason that in the present description, the extra over-head bit in the RAUDI scheme is described as the reference bit. The difference between this technique and the parity bit technique will become clear as this explanation continues.

Under the parity bit scheme, parity is calculated across the data bits, i.e. in a row cutting across the bitstreams in the bus, and the result sent across the interface on a separate parity port. In the receiver, all the potential skew combinations are constructed and an associated parity calculated. The parity for each possible skew combination is compared with the received parity over a period of many bits while trying to establish a reliable and exact match to the parity sequence.

Advantages of this scheme are:

It can compensate for skew across data with arbitrary format (in other words, it is data agnostic).

Disadvantages of this scheme:

If more then a few bits of skew compensation are required, either the hardware becomes complex, owing to the numerous skew possibilities introduced by the medium, or the time to find the correct skew compensation becomes extended (the implementer decides which). In either case the performance and complexity are inferior to the RAUDI scheme.

As the bus width increases or the skew increases, the complexity of implementation scales badly according to a power law.

If a single parity bit is used there are multiple possible matches of parity for an odd number of bits that have not yet been skew compensated. The time to characterise, and compensate for, the skew is thus dependent on the data itself and so is not deterministic.

To make the scheme practical, it may be necessary to calculate several bits of parity and add these as an overhead on the interface.

SUMMARY OF THE INVENTION

The invention therefore provides, in one aspect, a digital data communication system incorporating means to detect skew between n parallel digital data bitstreams relative to one another, the system comprising;
  a multiplexer arranged to sample bursts of data from said n parallel bitstreams according to a sampling sequence to form a reference bitstream;
  a driver arranged to insert said n parallel bitstreams and said reference bitstream into a signal path;
  a receiver arranged to retrieve the n parallel bitstreams and the reference bitstream from the signal path;
  a reference bitstream extractor arranged to recover the reference bitstream; and
  a comparator arranged to compare said extracted reference bitstream with said n retrieved parallel data bitstreams to produce outputs indicative of the offset of each of said parallel bitstreams relative to said reference bitstream.

The path may comprise a transmission channel. It may alternatively comprise a storage device. The storage device may comprise a dynamic recording and playback device, such as a tape or disk recorder or a static storage device, such as a random access memory. The path may comprise a computer network.

The system may further comprise a corrector to correct skew between said n parallel data bitstreams in accordance with said offset indicative outputs. The comparator may comprise a correlator arranged to correlate the data bitstreams with the reference bitstream over a plurality of spaced time intervals.

There may be a scrambler to scramble the bitstreams prior to insertion in the said path and a descrambler arranged to descramble the bitstreams recovered from the path.

The correlator may comprise:
  an input FIFO buffer connected to receive the n parallel data bitstreams and the reference bitstream from the path;
  at least one correlator connected to receive time-spaced samples of the data bitstreams passing through the input buffer and to compare them with the reference bitstream passing through the input buffer, whereby to produce offset outputs representative of the closeness of the match between the reference and the data bitstreams.

The system may further comprise a controllable delay device arranged to adjust the relative timing between data bitstreams in accordance with said offset outputs, whereby to correct the received data bitstreams for skew.

In addition, the system may further comprise:
  a sampler having:
    an input connected to an offset output of the correlator, said offset output representing the required amount of skew correction;
    an output connected to a control input of the said controllable delay device; and
    a control input controlling the passage of offset values between said offset output and said control input of said controllable delay means;
  the correlator having an output arranged to extract a signal corresponding to the sample sequence used by the said multiplexer to form the reference bitstream; and
  said correlator output connecting the said signal to the control input of the sampler;
  whereby the said signal controls the sampler to permit passage of a new offset value to the said controllable delay means only when there is a single occurrence of a correlation offset across the bitstreams at any given instant.

The system may also comprise a further multiplexer connected to the said path so as to insert message signals into the path. The further multiplexer can transmit said message signals by modulation of the reference bitstream. Alternatively, said further multiplexer is a time division multiplexer connected downstream of the multiplexer used to form the said reference bitstream, whereby to multiplex the message signals with the reference bitstream. Alternatively, said further multiplexer is connected to a direct output of said multiplexer used to form the said reference bitstream and to an inverted output from said multiplexer, and a source of message signals is connected to said further multiplexer such that message signals are sent by selective transmission of the direct or the inverted versions of the output from said multiplexer.

In addition, the said further multiplexer may comprise:
  a first time division multiplexer connected to an inverted version of said data bitstreams;
  a second time division multiplexer connected to a direct version of said data bitstreams;
  and wherein outputs from said first and second time division multiplexers are connected to the input of said multiplexer used to form the said reference bitstream, whereby to multiplex the message signal with the inverted version of the data bitstreams.

The system may further comprise a predictor connected to said comparator and arranged, in response to a signal derived from said comparator, corresponding to a sampling sequence used to form the said reference bitstream, to predict that bitstream which next correlates best with said reference bitstream.

There may be means to signal a fault condition when the predicted bitstream does not correlate as expected.

Where the said path comprises an optical fibre and a laser arranged to insert data bitstreams into said path, a control device may be arranged to shut down said laser in response to the generation of a fault condition.

In a second aspect, the invention comprises a method of detecting skew between n digital data bitstreams relative to one another, the method comprising;
  arranging said digital data into n parallel bitstreams;
  sampling bursts of data from said n parallel bitstreams according to a sampling sequence to form a reference bitstream;
  inserting said n bitstreams and said reference bitstream into a signal path;
  retrieving said n bitstreams and said reference bitstream from said signal path; and
  comparing the retrieved reference bitstream with said n retrieved parallel data bitstreams in order to produce outputs indicative of the offset of each of said n parallel bitstreams relative to said reference bitstream.

In this method said comparing step may comprise correlating said reference bitstream and said data bitstreams over a plurality of spaced time intervals.

The method may further comprise correcting the skew of said n parallel data bitstreams in accordance with said offset indicative outputs.

The method may further comprise scrambling the bitstreams prior to insertion into said path and descrambling the bitstreams after recovery from said path.

The correlating step may comprise:
  passing the recovered n parallel data bitstreams and the reference bitstream through an input FIFO buffer; and
  correlating recovered time-spaced samples of the data bitstreams passing through the input buffer with the reference bitstream passing through the input buffer, whereby to produce outputs indicative of the offset of the reference bitstream and the data bitstreams.

The method may further comprise the step of adjusting the relative timing between data bitstreams in accordance with said offset outputs of the correlator by means of a controllable delay device, whereby to correct skew between the data bitstreams.

This method may further comprise:
- passing said offset outputs of the correlator to a control input of the said controllable delay device through a controllable sampler;
- extracting from the correlator a signal corresponding to the sample sequence used to form the reference bitstream; and
- only permitting passage of a new offset value to the said controllable delay means when there is a single occurrence of a correlation offset across the bitstreams at any given instant.

The method may further comprise sending signalling messages over the said path. This signalling is preferably effected by connecting a message signal to an input of a time division multiplexer connected to the said multiplexer used to form the said reference bitstream, whereby to multiplex the message signal with the reference bitstream.

Alternatively, said signalling is effected by connecting a message signal to an input of a time division multiplexer connected to a direct output from the output of said multiplexer used to form the said reference bitstream and to an inverted output from said multiplexer, whereby to multiplex the message signal by selective transmission of the direct or the inverted versions of the output from the multiplexer.

The said signalling may be effected by:
- a first time division multiplexer connected to an inverted version of said data bitstreams;
- a second time division multiplexer connected to a direct version of said data bitstreams;
- connecting the outputs from the first and second time division multiplexers to the input of said multiplexer used to form the said reference bitstream; and
- connecting a message signal to an input of said first time division multiplexer, whereby to multiplex the message signal with the inverted version of the data bitstreams.

The method may comprise connecting a predictor to said comparator so as, in response to a signal derived from said comparator, corresponding to said sampling sequence used to form the said reference bitstream, to predict the data bitstream which next correlates best with said reference bitstream.

Further, the method may comprise signalling a fault condition when the predicted bitstream does not correlate as expected.

Where the path comprises an optical fibre and a laser arranged to insert data bitstreams into said path, there may be an additional step comprising shutting down said laser in response to the generation of a fault condition in the said path.

In a third aspect, the invention provides a digital data transmitter adapted to detect skew between n parallel digital data streams relative to one another, the transmitter comprising:
- a multiplexer arranged to sample bursts of data from said n parallel bitstreams according to a sampling sequence to form a reference bitstream; and
- a driver arranged to insert said n parallel bitstreams and said reference bitstream into a signal path.

The transmitter may further comprise a controllable delay device responsive to signals retrieved from the said path indicative of the offsets of each of said data bitstreams relative to said reference bitstream, whereby to adjust the relative timing between data bitstreams so as to correct skew.

The transmitter may alternatively comprise a correlator arranged to correlate the data bitstreams with the reference bitstream recovered from the signal path so as to produce offset outputs indicative of the offset of each of said data bitstreams relative to said reference bitstream.

The digital data transmitter may further comprise a controllable delay device responsive to said offset indicative outputs whereby to adjust the relative timing between data bitstreams so as to correct the detected skew.

In a fourth aspect, the invention comprises a digital data receiver for n parallel data bitstreams received over a signal path, said receiver incorporating means arranged to detect skew between said n digital data streams relative to one another, comprising:
- a receiver arranged to retrieve from said path said n parallel data bitstreams and a reference bitstream, said reference bitstream comprising sampled bursts of data from said n parallel bitstreams according to a sampling sequence;
- an extractor arranged to recover said-reference bitstream; and
- a comparator arranged to compare said extracted reference bitstream with said n received parallel data bitstreams in order to produce outputs indicative of the offset of each of said parallel bitstreams relative to said reference bitstreams The receiver may further comprise a driver arranged to insert into said path, for reverse transmission to a transmit side of the said path, a signal representing the offset indicative outputs of the said comparator.

The receiver may alternatively comprise a corrector arranged to correct skew between said n parallel data bitstreams in accordance with said offset indicative outputs.

In the receiver, the comparator may comprise a correlator to correlate the data bitstreams with the reference bitstream over a plurality of spaced time intervals.

In a fifth aspect, the invention comprises a method of transmitting digital data over a signal path in such a way as to enable detection of skew between digital data bitstreams relative to one another, the method comprising;
- arranging said digital data into n parallel digital data bitstreams;
- sampling bursts of data from said n parallel bitstreams according to a sampling sequence to form a reference bitstream; and
- inserting said n bitstreams and said reference bitstream into said signal path.

In a sixth aspect, the invention comprises a method of receiving digital data from a signal path in such a way as to enable detection of skew between n parallel digital data bitstreams relative to one another, the transmitted data comprising said n parallel digital data bitstreams and a reference bitstream comprising sampled bursts of data from said n parallel bitstreams according to a sampling sequence, the method comprising:
- retrieving said n parallel data bitstreams and said reference bitstream from said signal path;
- extracting said reference bitstream; and
- comparing said extracted reference bitstream with said n received parallel data bitstreams in order to produce outputs indicative of the offset of each said data bitstream relative to said reference bitstream.

This method may further comprise correcting skew between said n parallel data bitstreams in accordance with said offset indicative outputs.

In a seventh aspect, the invention comprises a digital signal comprising a plurality of n digital data bitstreams and a reference bitstream, said reference bitstream comprising a series of bursts of samples from said n data bitstreams, whereby skew between the data bitstreams may be detected.

In an eighth aspect, the invention comprises a digital signal comprising a plurality of n digital data bitstreams that have been corrected for skew by a method comprising the steps of:

arranging a source of digital data into n parallel bitstreams;

sampling bursts of data from said n parallel bitstreams according to a sampling sequence to form a reference bitstream;

inserting said n bitstreams and said reference bitstream into a signal path;

retrieving said n data bitstreams and said reference bitstream from said signal path;

extracting said reference bitstream; and comparing said extracted reference bitstream with said n received parallel data bitstreams in order to produce outputs indicative of the offset of each said bitstream relative to said reference bitstream.

In a ninth aspect, the invention comprises a digital signal comprising a plurality of n parallel data bitstreams that have been corrected for skew by a digital data transmission system, the system comprising;

a multiplexer arranged to sample bursts of data from said n parallel data bitstreams to form a reference bitstream;

a driver arranged to insert said n parallel data bitstreams and said reference bitstream into a signal path;

a receiver arranged to retrieve said reference bitstream and said data bitstreams from said signal path;

a comparator arranged to compare the recovered reference bitstream with the received parallel data bitstreams in order to produce outputs indicative of the offset of each of said parallel data bitstreams relative to said reference bitstream; and an adjustable delay device arranged to adjust the relative timing between said data bitstreams in accordance with said offset indicative outputs.

In a tenth aspect, the invention comprises a digital signal comprising a plurality of n parallel data bitstreams that have been corrected for skew resulting from passage over a signal path of n parallel data bitstreams and a reference bitstream, said reference bitstream comprising sampled bursts of data from said n parallel data bitstreams according to a sampling sequence, skew having been corrected by a method of receiving transmitted data comprising:

retrieving said n parallel data bitstreams and said reference bitstream from said signal path;

extracting said reference bitstream;

comparing said extracted reference bitstream with said n retrieved parallel data bitstreams in order to produce outputs indicative of the offset of each said data bitstream relative to said reference bitstream; and correcting the skew between said n parallel data bitstreams in accordance with said offset indicative outputs.

In an eleventh aspect, the invention comprises a digital data signal comprising n parallel data bitstreams and a reference bitstream comprising sampled bursts of said n parallel data bitstreams according to a sampling sequence.

In a twelfth aspect, the invention comprises a signal path carrying a digital data signal according to the preceding paragraph.

In a thirteenth aspect, the invention comprises a digital data communication system incorporating means to detect skew between n parallel digital data bitstreams relative to one another, the system comprising a transmit side and a receive side, the said receive side comprising:

a multiplexer arranged to sample bursts of data from said n parallel bitstreams according to a sampling sequence to form a reference bitstream;

a driver arranged to insert said reference bitstream into a signal path for reverse transmission to the transmit side;

the said transmit side comprising:

a reference bitstream extractor arranged to recover the reference bitstream from the signal path; and a comparator arranged to compare said extracted reference bitstream with said n parallel data bitstreams to produce outputs indicative of the offset of each of said n parallel bitstreams relative to said reference bitstream.

This system may further comprise a corrector to correct skew between said n parallel data bitstreams in accordance with said offset indicative outputs.

The receive side may further comprises a phase detector to detect the phase difference between the data bitstreams and a reference clock.

The receive side may yet further comprise a modulator to modulate said reference bitstream to indicate to the transmit side any detected phase error.

The modulator may comprise a multiplexer arranged to transmit selectively a direct or an inverted version of the reference bitstream.

The transmit side of the communication system may further comprise a transmitter arranged to insert said n parallel data bitstreams into said signal path, said transmitter further being controlled so as to minimise fractional skew.

The said transmitter on said transmit side is preferably controlled in accordance with error signals derived from a comparison of the relative phase between a reference clock and error signals output from a comparator arranged to detect skew between the n parallel data bitstreams and the said reference bitstream.

The said phase detector at said receive side is preferably arranged to indicate three phase states in which the reference clock is (i) in advance of or (ii) lags the data bitstream or (iii) the phase angle is unknown.

The said phase detector at the receive side may be arranged to suppress passage of output signals indicating either the first or the second phase states when the third phase state exists.

The said phase detector at the receive side is advantageously arranged to send an alternating signal when the third phase state exists.

The said multiplexer arranged to sample bursts of data may further comprise a comparator arranged to determine whether correlation exists between the sample burst of data currently being transmitted and the sample burst of data to be transmitted next.

The last mentioned comparator is preferably arranged to substitute a different sampling sequence when it is determined that said correlation exists, whereby to avoid false skew detection.

In a fourteenth aspect, the invention comprises a digital data communication transmitter, comprising:

- a driver arranged to insert into a signal path n parallel digital data bitstreams;
- a reference bitstream extractor arranged to extract a reference bitstream from said signal path, said reference bitstream comprising sample bursts of data from said n parallel data bitstreams;
- a comparator arranged to compare said extracted reference bitstream with said n parallel data bitstreams to produce outputs indicative of the offset of each of said n parallel data bitstreams relative to said reference bitstream.

In a fifteenth aspect, the invention comprises a digital data communication receiver arranged to receive n parallel digital data bitstreams over a signal path, said receiver further comprising:

- a multiplexer arranged to sample bursts of data from said n parallel digital data bitstreams according to a sampling sequence to form a reference bitstream; and
- a driver arranged to insert said reference bitstream into said signal path for reverse transmission to a transmit side of the signal path.

BRIEF DESCRIPTION OF THE DRAWINGS

FIGS. 16, 17 and 18 are diagrams useful in explaining signalling;

DETAILED DESCRIPTION OF THE ILLUSTRATED EMBODIMENTS

In the following sections of description, a detailed explanation of various aspects of the basic skew correction system will be given. In addition, sections are devoted to explaining additional features of the system that emerge from the basic system and that can be applied with enormous cost and performance advantages to new and existing data transmission systems.

RAUDI—Basic Principals of Operation

Various techniques have been specified by standards bodies to overcome the effects of skew in a channel. Although these operate correctly, each has significant flaws or usage restrictions that have been described in the context of the introductions already given above. The present invention has the capability to automatically compensate for any amount of overall skew (gross or fractional), across any width of bus carrying data of arbitrary format. It performs this function without the flaws or restrictions present in the other schemes.

Figure 10:
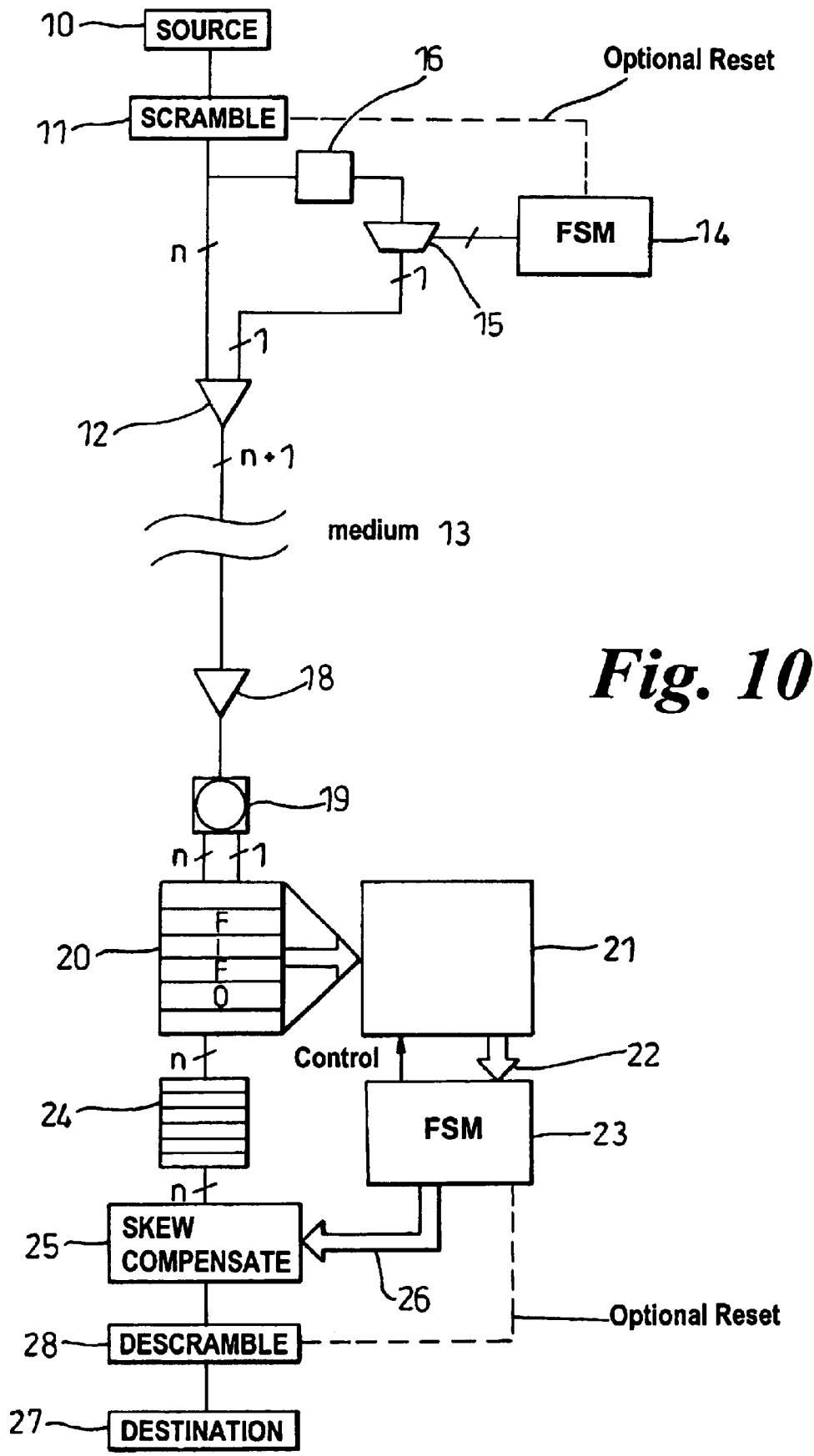
FIG. 10 is a schematic diagram showing one implementation of the invention.

Referring then to FIG. 10, a digital data transmission system is illustrated. It consists of a transmitter end, also referred to as a transmit interface, comprising a source 10 of digital data, an optional scrambler 11, whose significance will be appreciated later, and the components making up the transmit end of the skew compensation system. The digital data is depicted as made up of an n-bit bus (but drawn as a single line) which, as the skilled man would appreciate, is connected to a driver 12 of appropriate kind to insert the data signal into a transmission medium 13 of any arbitrary kind, such as electric wire or cable, optical fibre, radio, photonic or any other current or future link which relies on a medium over which the data is transmitted.

Skew correction according to the invention is achieved by adding a minimum of one additional bit to the width of the interface. As already mentioned in the introduction, this additional bit is called the reference bit.

The transmit interface, in its simplest form, is thus comprised of the original data bus (carrying the "payload") and the reference bit. As shown in FIG. 10, the reference bit is derived from the data bus itself and is recombined with the n-bit data for insertion into the transmission channel by a suitable driver.

The reference bit itself is derived from the data bits on the bus as follows. A frame sequence generator 14 generates a sequence of instructions to a time division multiplexer 15 that takes bursts of data from each line of the bus in a particular sequence. Block 16 represents an optional manipulator, for example for anonymous burst, annotated burst and absolute time stamping.

The simplest sequence, which will be used for illustrative purposes in this section of the description, could consist of a straightforward cyclical sample of each bus line in turn, in other words bit-0, bit-1, bit-2 and so on to bit-n after which the cycle will recommence at bit-0. The size of sample will depend on a number of factors. The size of the burst sample-for each bit will depend on a number of factors.

Typically the larger the burst sample the quicker the skew corrector will converge. Conversely, the smaller the burst sample, the quicker errors will be detected. The size of sample is therefore a factor that will be decided in dependence on the nature of the transmission link itself.

Figure 11:
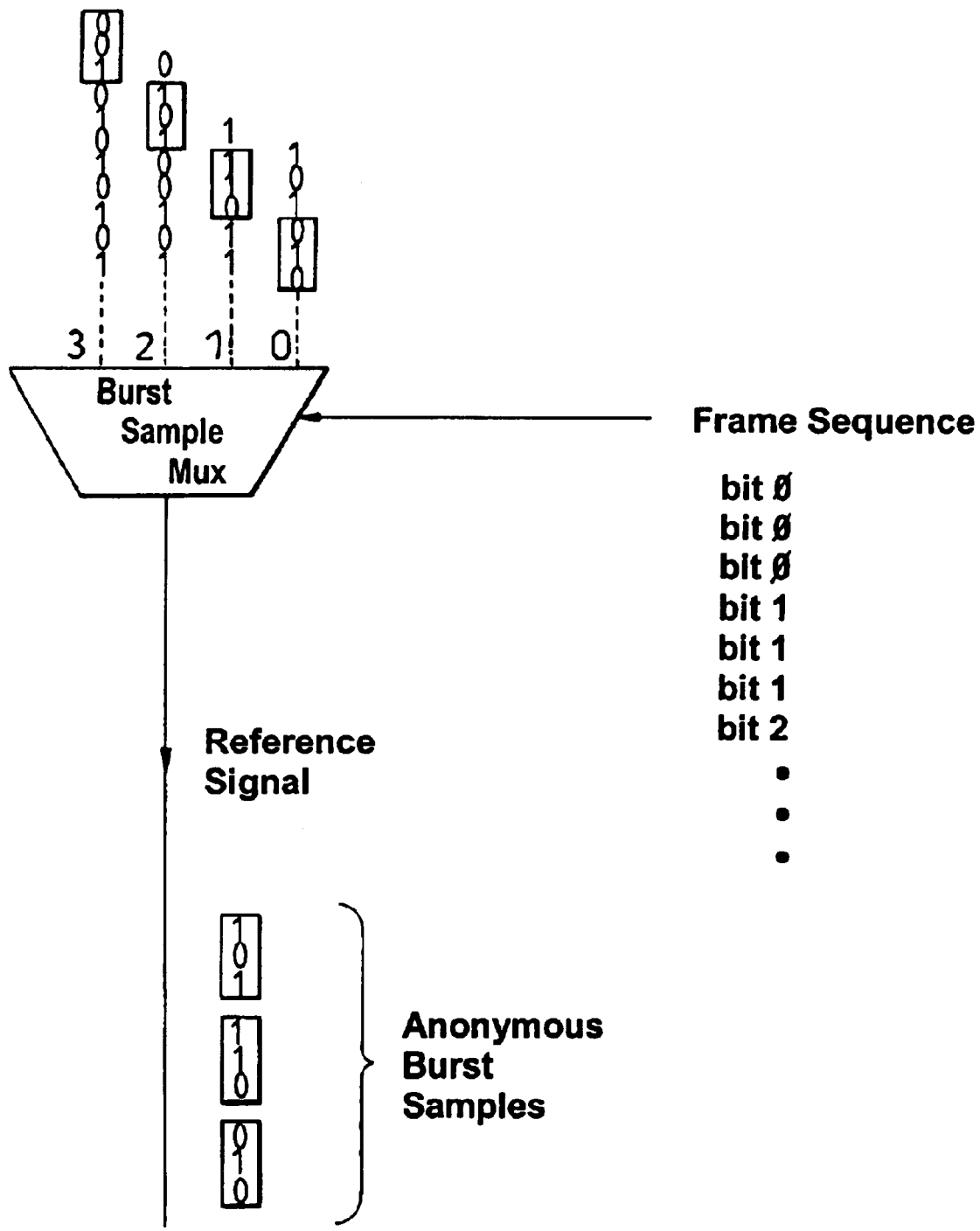
FIG. 11 is a schematic diagram showing the operation of the implementation in FIG. 10.

At this point, it is convenient to refer to FIG. 11 to understand the significance of the reference bit and the essential role it plays in the skew correction technique.

The principals associated with the application and manipulation of the reference bit are fundamental to the operation of the RAUDI. Although this bit can be thought of as being analogous to a parity bit (as used on conventional interfaces for detecting or correcting bit errors), the content and functional manipulation of this bit is not at all the same as a parity bit.

Whereas a parity bit is calculated in parallel across the bus, the function applied to the reference bit operates serially, thereby containing additional information related to the history of the payload and hence the time at which it occurred. The reference bit carries manipulated versions of individual bits from the data bus, sampled over an interval of time that is an integer number of bit periods (burst sampling).

As previously mentioned with reference to FIG. 10, this process is controlled by a state machine that generates a frame sequence. By transferring the information contained in the reference bit to the other side of the channel, the time information is also passed to the other side of the channel. Note that because the data and the reference bit are transferred across a channel that is subject to skew, the significance of the time in absolute terms is lost. However, the relative time offset superimposed on them is a measure of the skew encountered in the channel. Since the relative arrival time of all data bits with respect to the reference bit can be extracted at the receiver, gross skew can be compensated for in the receiver. Fractional skew is already removed by the plesiochronous interface. The most simple manipulation of the data bits is to send direct versions of them but there may be instances where it is preferred to send inverted versions. Inversion may be of advantage for signalling purposes, as will be discussed under that heading later. This is known as anonymous burst sampling.

Figure 12:
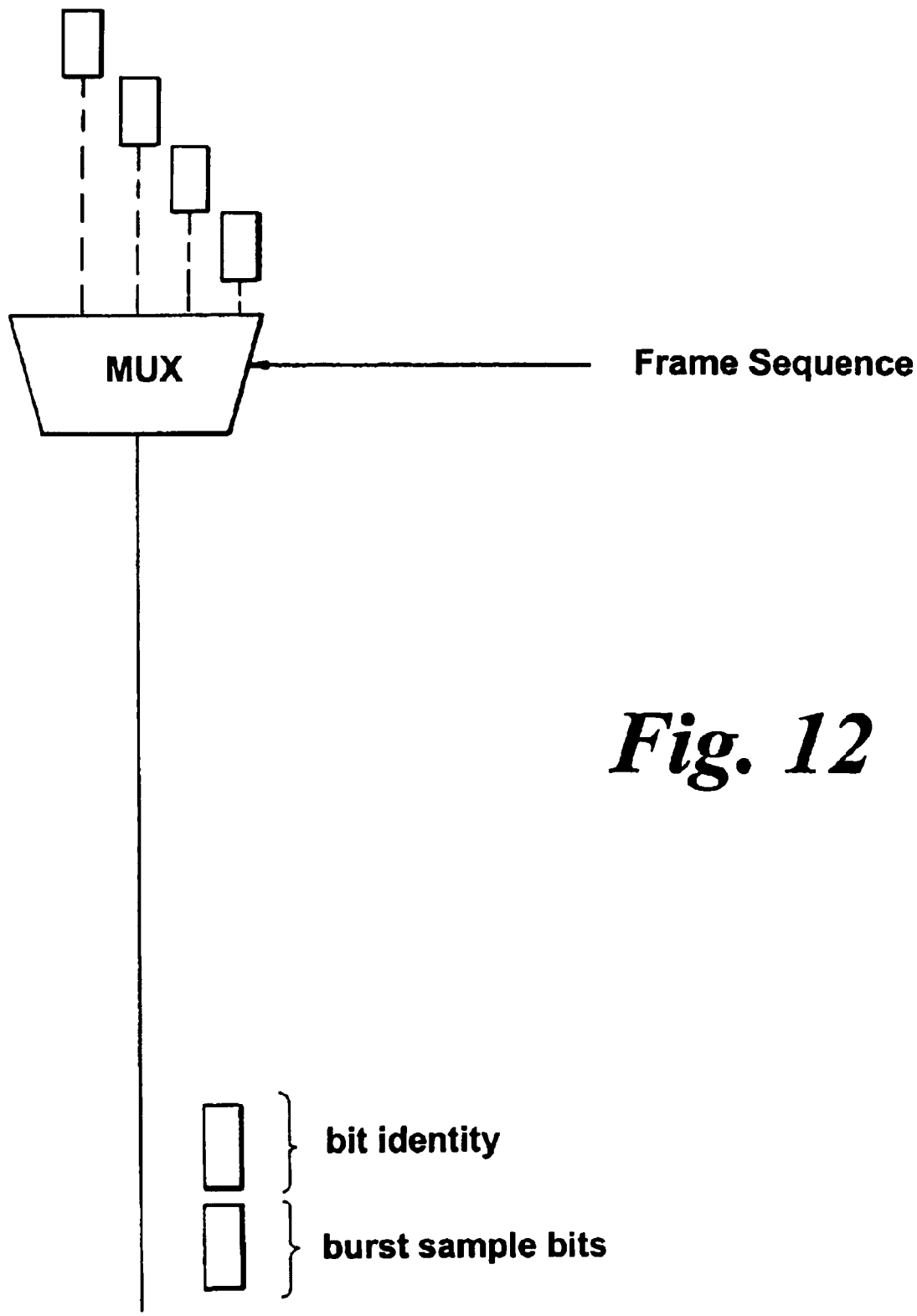
FIG. 12 shows a variation of the operation depicted in FIG. 11.

It is also possible to send the bit identity directly by annotating the bit identity of the burst sample as a preamble or post-amble within the reference bit data stream annotated burst sample, as shown in FIG. 12. This is not essential to the working of the skew correction technique and can erode the useful bandwidth of the reference bit and hence other, more desirable performance parameters. Anonymous burst sample transmission is thus the most preferred form. The manipulator 16 in FIG. 10 makes these operations and other functional manipulations possible.

Other functional manipulations of the RAUDI reference bit could include combinations of the following: parity calculation; Cyclic Redundancy Checking; basic burst sampling; and "Absolute Time Stamping" (where both sides of the interface maintain an absolute time reference to within some tolerance).

Operation using absolute time stamps (via block 16 in FIG. 10) may be most applicable in pure optical communications systems where accurate real-time clocks are already deployed. Although not fundamental to RAUDI operation, these alternative manipulations of the reference bit may allow further optimisation of the interface for specific applications.

These options are catered for in the system described in FIG. 10 by the incorporation of a circuit block in the path between the bus and the frame sequence-controlled multiplexer.

In FIG. 11, samples from the bus lines are indicated schematically as consisting of windows of three bits taken cyclically from line to line. Again, for simplicity, only four lines 0, 1, 2, 3 are illustrated but it will be appreciated that the bus could be of any number of lines. In order to achieve this sampling, the frame sequence generator is shown as generating the cyclical sequence 000, 111, 222, 333, 000 etc. These bursts of data are shown being passed in serial fashion to the transmitter driver for insertion into the channel.

Figure 1:
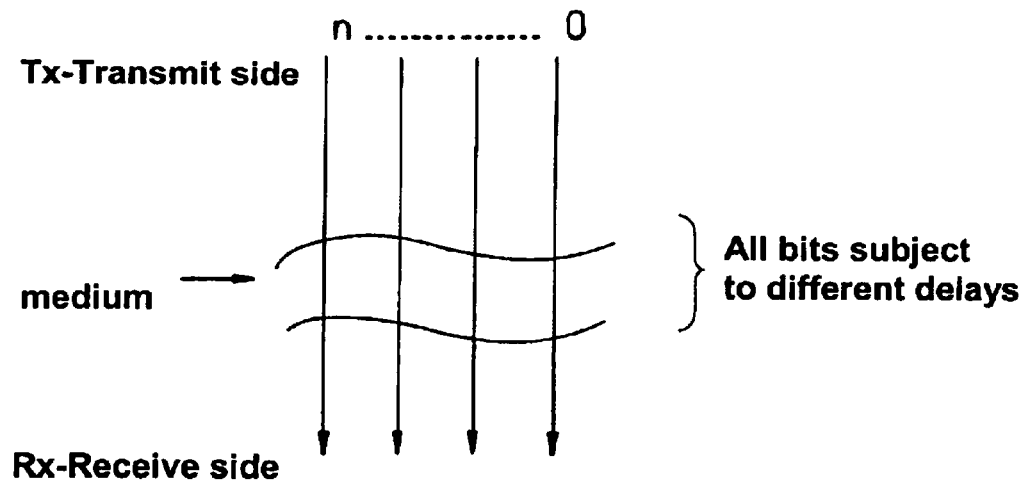
FIG. 1 depicts a schematic diagram of a basic digital data transmission system subject to skew.
Figure 2:
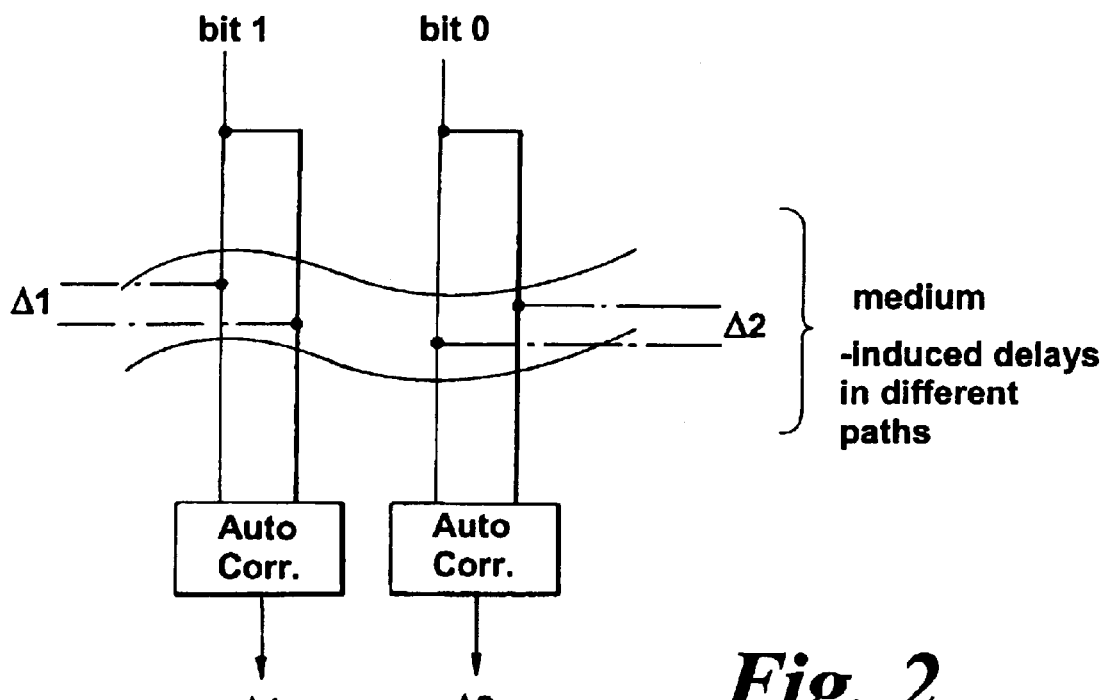
FIG. 2 depicts auto-correlation in a skew measurement system.
Figure 3:
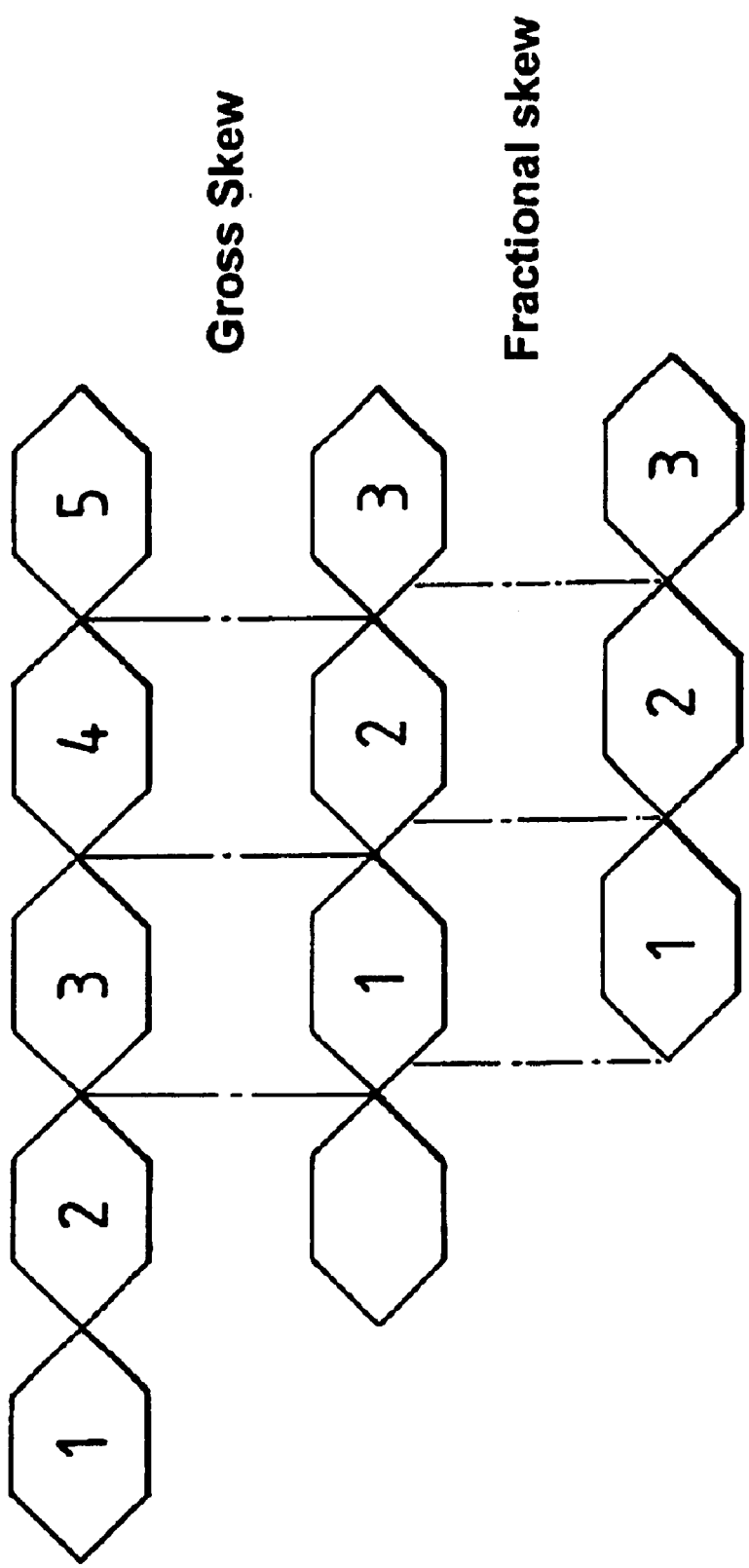
FIG. 3 shows a schematic representation of the skew.
Figure 4:
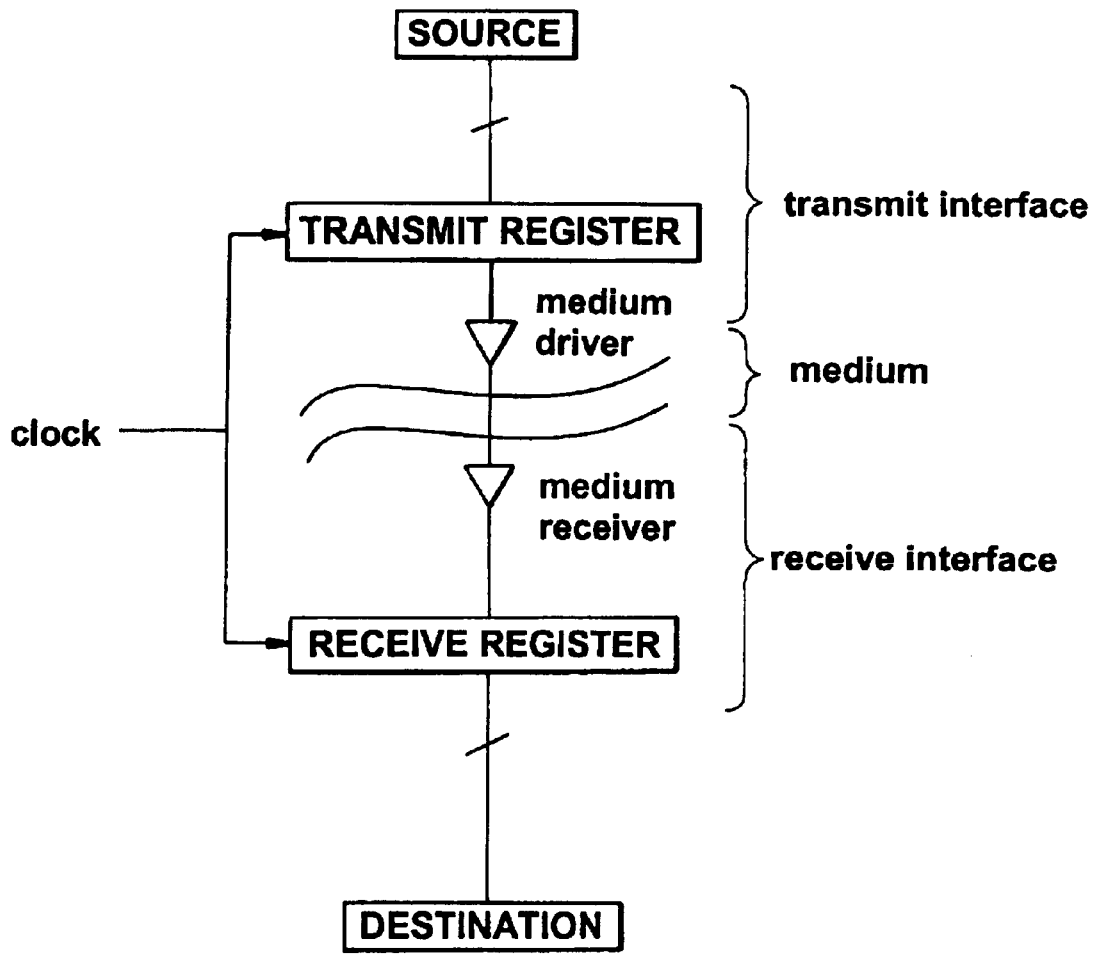
FIG. 4 is a schematic to assist with the definition of some terms.
Figure 5:
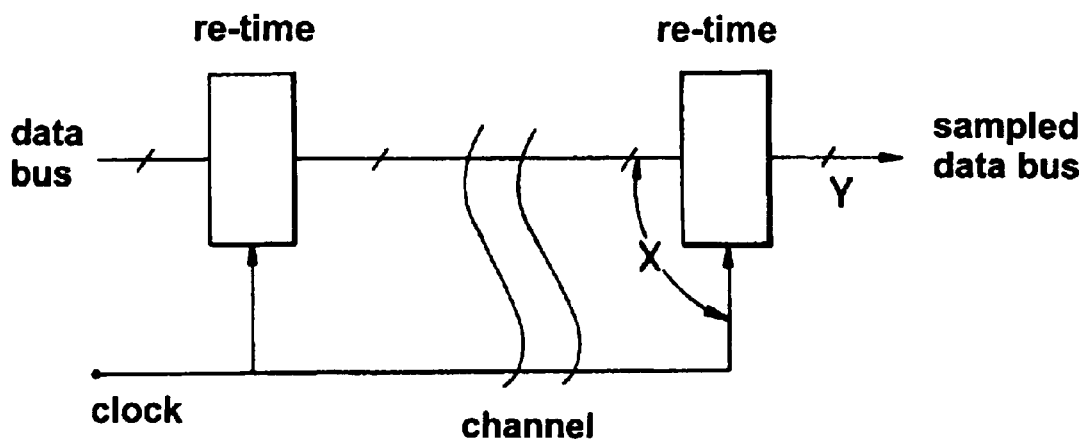
FIG. 5 is a schematic diagram useful in illustrating another known technique for skew compensation.
Figure 6:
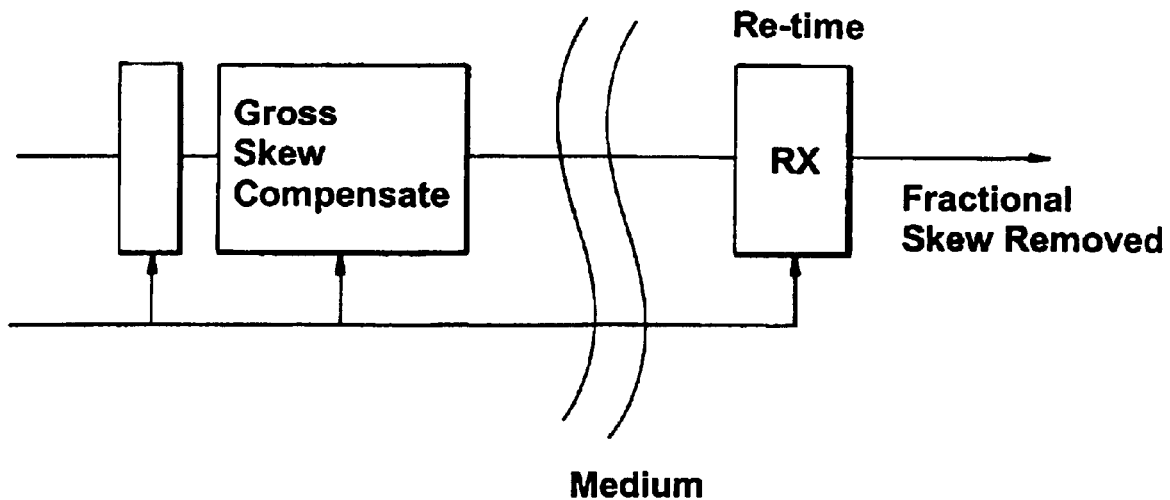
FIG. 6 is a schematic diagram useful in illustrating a further known technique for skew compensation.
Figure 7:
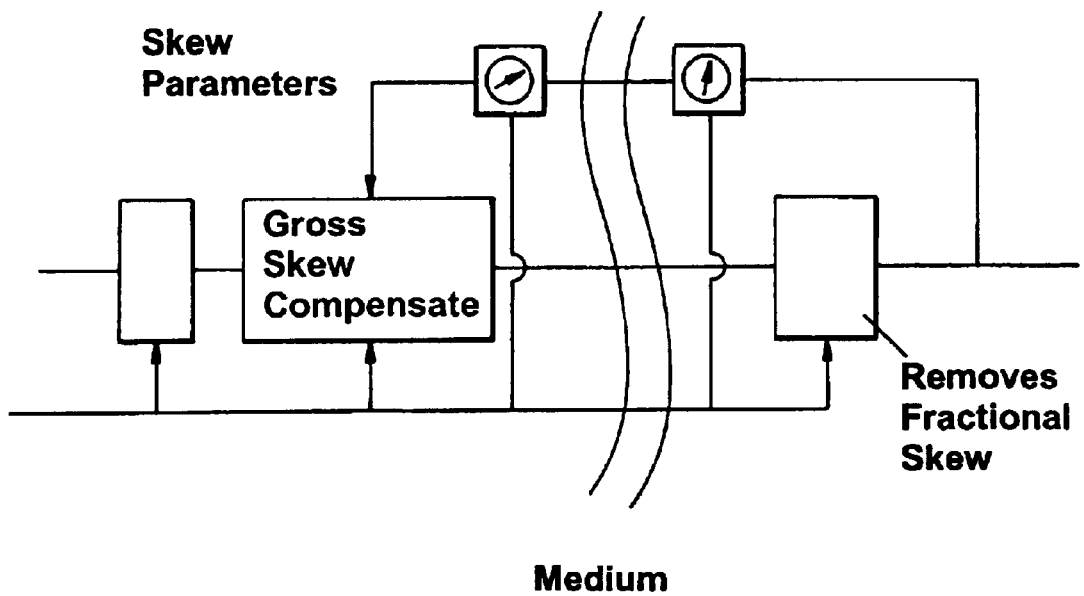
FIG. 7 is a schematic diagram useful in explaining the technique for skew compensation depicted in FIG. 6.
Figure 8:
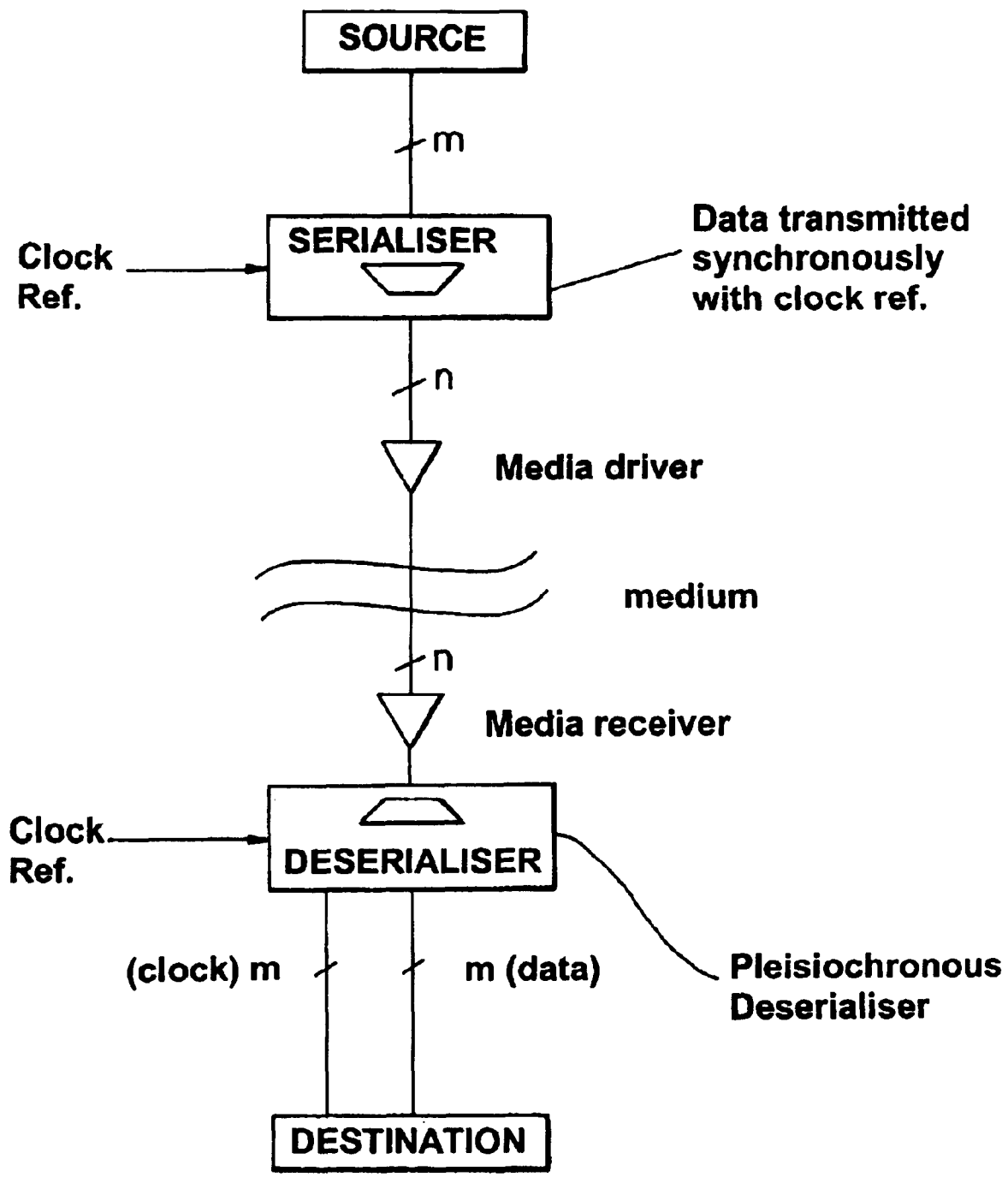
FIGS. 8 and 9 are schematic diagrams useful in illustrating skew compensation in a plesiochronous transmission system.
Figure 9:
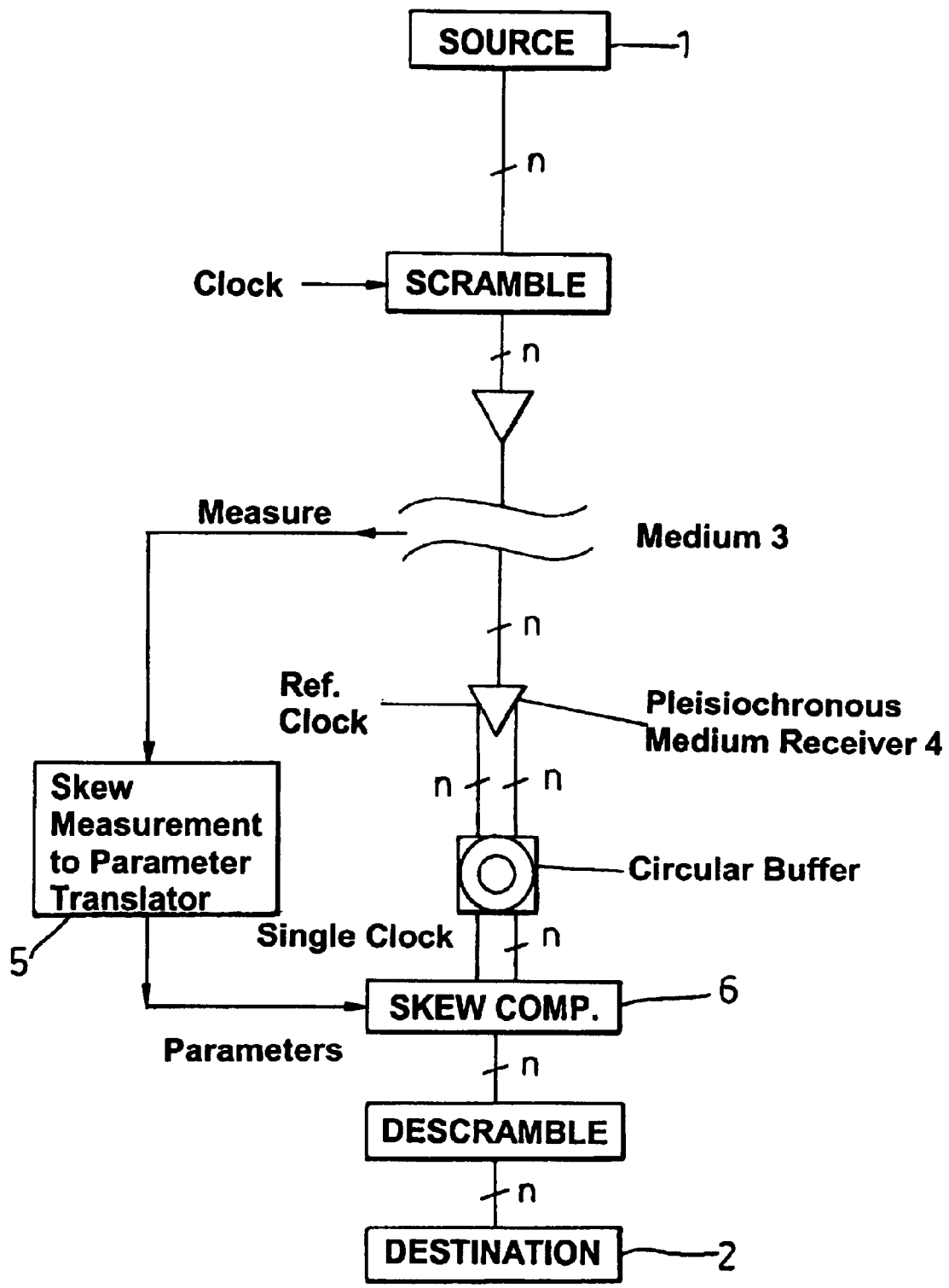

Reverting to FIG. 10, at the receive end, or receive interface, of the transmission link, the data receiver 18 detects the received data and sends it through a buffer, typically a circular buffer 19, as already discussed with reference to plesiochronous systems in FIG. 9, for onward passage into the skew corrector.

At the output of the buffer in the receive end, the reference bit is extracted and fed separately from the n data lines also emerging from the buffer. These two sets of data are fed into an input FIFO buffer 20 from which only the data bus streams emerge. Outputs from the FIFO buffer are fed to a comparator block 21 which tests for matches between the data streams and the reference streams at various offsets within the FIFO.

The output from the correlator 21 consists of a sequence of outputs 22 which indicates when a match exists, on which bits, and at which delay offset within the FIFO, the match exists. These occur in the same sequence as the framing sequence at the transmit end and at the same repetition frequency, if periodic.

The correlator block 21 compares the reference data and individual bits in the data bus, across a period of history stored in the receiver input FIFO buffer 20. When a strong match is made between data in the reference bit and an individual data bit, the bit identity of the reference data is immediately known. The correlation is also performed across delayed versions of the incoming data bit, the maximum delay used being dependent on the maximum skew compensation required. When a strong match is found at a given delay offset, the skew associated with the bit identity is known. Because of the infinite risk of false matches with other bits (not currently in the reference stream) it is necessary to eliminate these by only updating the skew offsets 22 when there is a unique match found. Note that these false matches can occur even in the presence of anti-correlation scrambling.

One of the most powerful aspects of the invention is that the correlator is capable of indicating not only when the next correlation is to be expected and on which bit line of the bus but also it will predict the expected offset, assuming the transmission channel characteristics have not change since the last time that the correlator looked at that particular bit line.

The finite risk that hard transmission errors will result in the erroneous identification of the bit identity or the bit offset is overcome by sending bits to the reference from the data bus in a pattern that is repeated (the frame sequence). By monitoring the pattern of bit identities received over a period of time, this pattern can be deduced regardless of what it is. When hard errors occur, false matches occur at bit identities which are out of sequence with the sequence previously deduced, so can be ignored. This scenario will be examined later with reference to FIG. 13.

The repeating pattern is analogous to the fixed format frame used in other schemes but the RAUDI frame is an artefact of the RAUDI only, not the data format, so is completely flexible in both repetition rate and pattern, allowing further modes of operation. Note that this pattern can be changed dynamically to achieve further modes of operation that are described later.

It also possible (and desirable) to reduce the risk of false correlations, by scrambling the data prior to transmission ("anti-correlation scrambling"). Anti-correlation scrambling is present to protect against a small sub-set of data patterns that contain a lot of redundancy. For example, either inadvertently or maliciously, a sequence of zeros may be assembled for transmission. The presence of an anti-correlation scrambler can thus improve the offset acquisition times in the presence of such data and is required anyway for the correct operation of the plesiochronous receiver.

RAUDI Description—Basic Operation

In this mode of operation, as illustrated in FIG. 10, skew correction (compensation) is performed on the receive side of the interface as described originally in the basic operating principals. This is known as forward compensation. Two RAUDI interfaces, one each at the send and receive sides, are instantiated to implement a full-duplex link.

Operation is according to the basic operating principals previously described. A signalling path can be introduced to allow signalling between both sides of the interface. Methods used for signalling are described later and are specific to the RAUDI operating principals. State machines have been shown to provide the control functions.

A multiplexer selects data from each bit in turn according to the bit identity sequence (generated by the frame sequence generator) currently in use to implement the RAUDI frame. For reasons applicable to reverse RAUDI skew compensation, it can be advantageous to bit invert (Boolean NOT) the data prior to transmission over the reference bit, but this is not essential to the basic operation of the system. For this reason, the bit inverter 17 is shown in FIG. 10 but its presence is not essential to the basic operation of the system.

The duration of the burst sample, i.e. the window, can be fixed but it is advantageous to manipulate the burst length depending on the current status of the link. During initialisation, the burst duration is preferably initially long; each bit being sent for multiple bit periods. This allows rapid bit identification and frame extraction at the receive end. As the link becomes established the frame period can be reduced, allowing faster detection of errors.

The state machine/frame sequence generator can also optionally control the scrambler when synchronised scrambler pairs are used (see scramblers later). On the receiver side (and following synchronisation to the single clock), the data and reference bits are clocked in parallel into the input FIFO buffer. The width of this FIFO may need to be broadened by de-multiplexing to lower rates but this in no way affects the function and is due to implementation technology limitations.

At the receive end, skew correction/compensation requires two distinct operations. In the first, the amount and direction of skew are measured or detected. In the second, the skew is corrected by adjusting the relative delays between the bitstreams in response to the measured/detected skew.

As shown in FIG. 10, the received data on the n bitstreams in addition to the single reference bit are passed through the input FIFO. At the same time, the bitstreams are passed into the correlator block which performs correlation functions on each of the bitstreams relative to the reference bit. Whenever a match occurs between the reference bit and the bitstream currently under consideration the correlator produces an output to a finite state machine 23 (e.g. a processor).

This output will be cyclical in the same order as the frame sequence generated at the transmit side and at the same frequency. This is purely because of the nature of the frame sequence generated at the transmit side.

Reverting to FIG. 10, the data bitstreams emerging from the FIFO buffer pass through an exit FIFO buffer 24 and into a skew compensation/correction block 25. The control input 26 to this block is derived from an output of the finite state machine 23 and serves to adjust the relative timing/phase of the bitstreams relative to one another so as to restore the original timing/phase relationship between them as was present in the original data at the transmit side. If necessary, the data output from the skew correction block is connected to the destination block 27 via a descrambler 28. This may be an end user interface or may be an intermediate stage, such as a repeater, in a longer communication channel.

The skew correction block and the exit FIFO buffer may be implemented in one and the same block such that the relative phase at which the bitstreams are extracted from the buffer are adjusted in response to the output from the finite state machine.

Figure 13A:
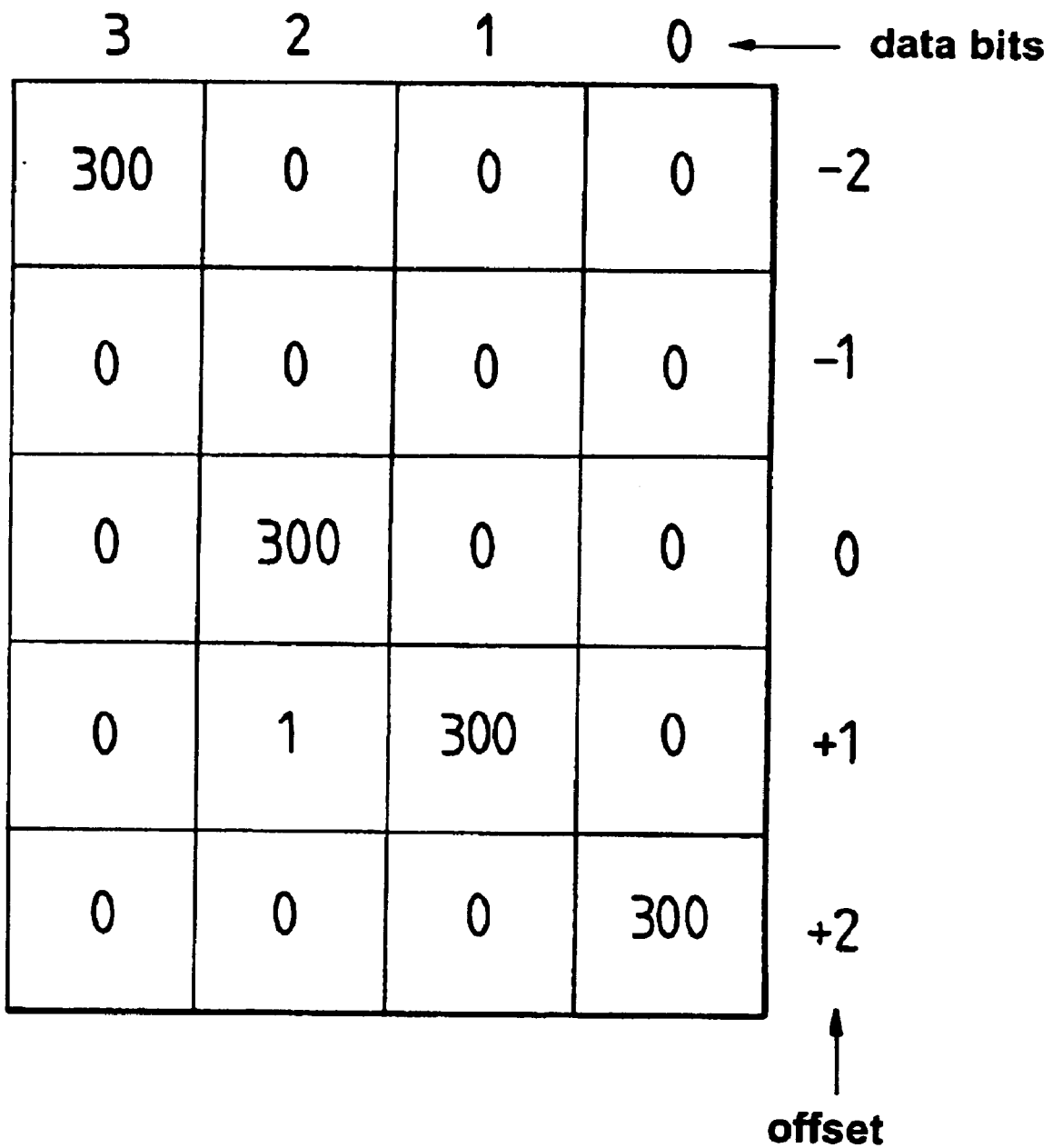
FIGS. 13a and b show different correlation results that can be used by the invention for fault detection and other purposes.

The manner in which the reference bit is used for error detection can best be understood by reference to FIG. 10 in collaboration with FIG. 13a which shows a table representing the cumulative total correlation peaks detected in the correlator block over a rolling 100 frame period. There are many ways of analysing the data and history of the correlator outputs. This is just one example to demonstrate the functionality. These diagrams do not show correlator searches for signalling information.

The diagram represents a hypothetical situation (for ease of explanation and understanding) in which there are four bitstreams 0 to 3. The table shows the number of peak correlator outputs taken over a rolling 100 frame period corresponding to the sequence 000, 111, 222, 333, 000 etc. The columns represent the individual bitstreams and the rows represent the bit offsets as a result of skew in the transmission channel. Offset values ranging from 2 to +2 through zero (phase alignment with the reference bit) are depicted. The figures of zero or 300 in the intersections of the rows and columns represent the cumulative total of the peak correlations over the rolling frame period.

It can thus be observed that the peak correlation for bit-0 occurs with an offset of +2, that for bit-1 occurs at offset +1, that for bit-2 occurs at zero offset and that for bit-3 occurs at offset −2. The inventive technique can predict at which bitstream the next peak correlation will occur, in synchronism with the frame sequence. In the steady state, the technique can also predict the offset value of that next bitstream. However, it is possible that a false correlation may occur as a result of a transient error somewhere in the transmission channel. Such an instance is represented by the correlation value 1 shown in the intersection of bit-2 and offset +1. The technique is robust enough, because of the repetitive nature of the frame sequence, to identify this "minor" peak as a false correlation because its arrival time and offset position are not within the expected interval, thereby indicating an error that can safely be ignored, at least for that rolling period.

FIG. 13a has thus shown how the skew parameters are extracted even in the presence of errors introduced by the channel. With each successive clock, the data and reference are clocked one row deeper into the FIFO such that it stores a rolling history of the data and reference bits required as input to the correlator block. Within the correlator block multiple correlations are performed according to the basic principals of operation. Note that for reasons that will be described later, the need for multiple correlations does not necessarily require a proliferation in implementation complexity.

Two types of correlator can be used here. The first type is an equivalence checker (i.e. it only has a single bit value that is true when the inputs to the correlator are identical). The second type provides a numerical output, indicating how similar the two inputs are. The type chosen depends on how much predictive behaviour the receiver requires to achieve the desired performance. With a numerical output, it is possible to see the imminent arrival of correlation peaks and so the time taken to make algorithmic decisions is reduced and intelligent pre-emptive actions are possible. A numeric output is particularly useful when the burst duration is being reduced although a one bit numeric output is still usable if the width of the correlation is not more than the burst sample length.

The correlator block 21 sends the results from all correlation events to the finite state machine 23 where decisions are made to determine bit identities and associated skew values (an integer number of bit periods). Having derived the relative skews for each data bit, the corresponding offsets can be derived (the skew values and the offsets are notionally identical). Collectively, the offsets define the inverse function to the gross skew and these are passed to the skew compensator 25. In this case, the buffer has outputs that can be tapped from anywhere within the history on a per-bit basis. The offsets cause the per-bit by-passing of integer delays in the exit buffer. The output from the exit buffer/skew compensator is fully skew compensated data. The exit buffer does not normally require a bit for the reference but, in certain applications, extended functionality may be achieved if the reference bit is re-aligned with the output data and passed up the hierarchy with the data. This output is known as the output pass-through bit. It is useful because it can contain framing, signalling information or additional payload.

Figure 15:
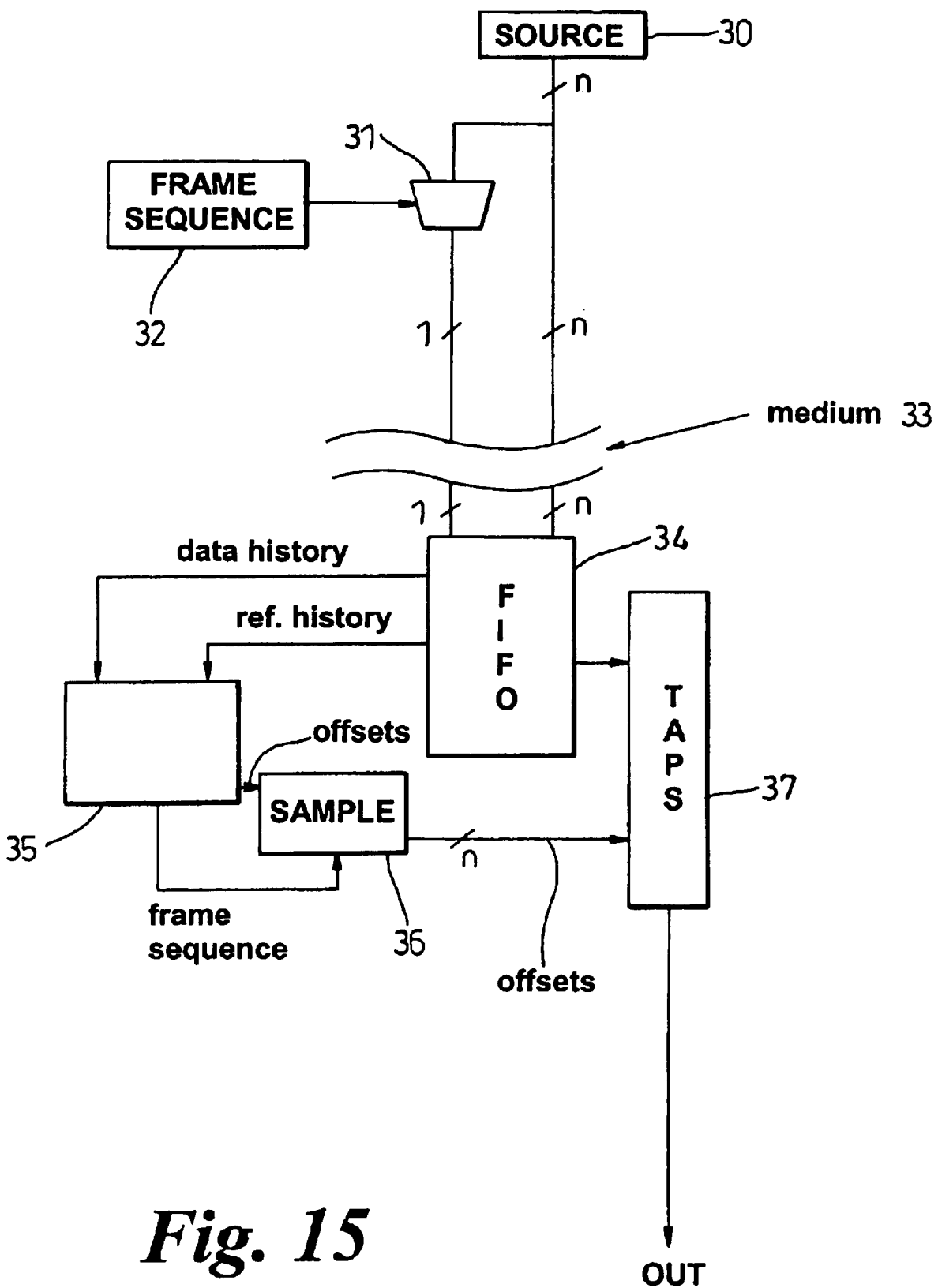
FIG. 15 is a schematic diagram showing the functional blocks forming the skew compensator according to the invention.

Referring now to FIG. 15, which is a schematic implementation of the invention in its most fundamental elements, the transmit side includes a data source 30 of n-bits wide, a multiplexer 31 controlled by a frame sequence generator 32 to produce the reference bit from the n-bit samples taken from the data bitstreams, and drivers (not shown) to insert the bitstreams into the transmission channel 33. All of this corresponds to the transmit side previously described.

At the receive side, the data is processed as previously described and fed into a FIFO buffer 34 that performs the functions of both the input and exit FIFO buffers in FIG. 10. The single reference bit is separated from the data bitstreams and passes to the "correlator" block 35. The data bitstreams are also branched off into the correlator block 35. Over a period of time, it can be seen that the inputs to the correlator block 35 comprise a historical snapshot of the bitstreams.

Figure 14:
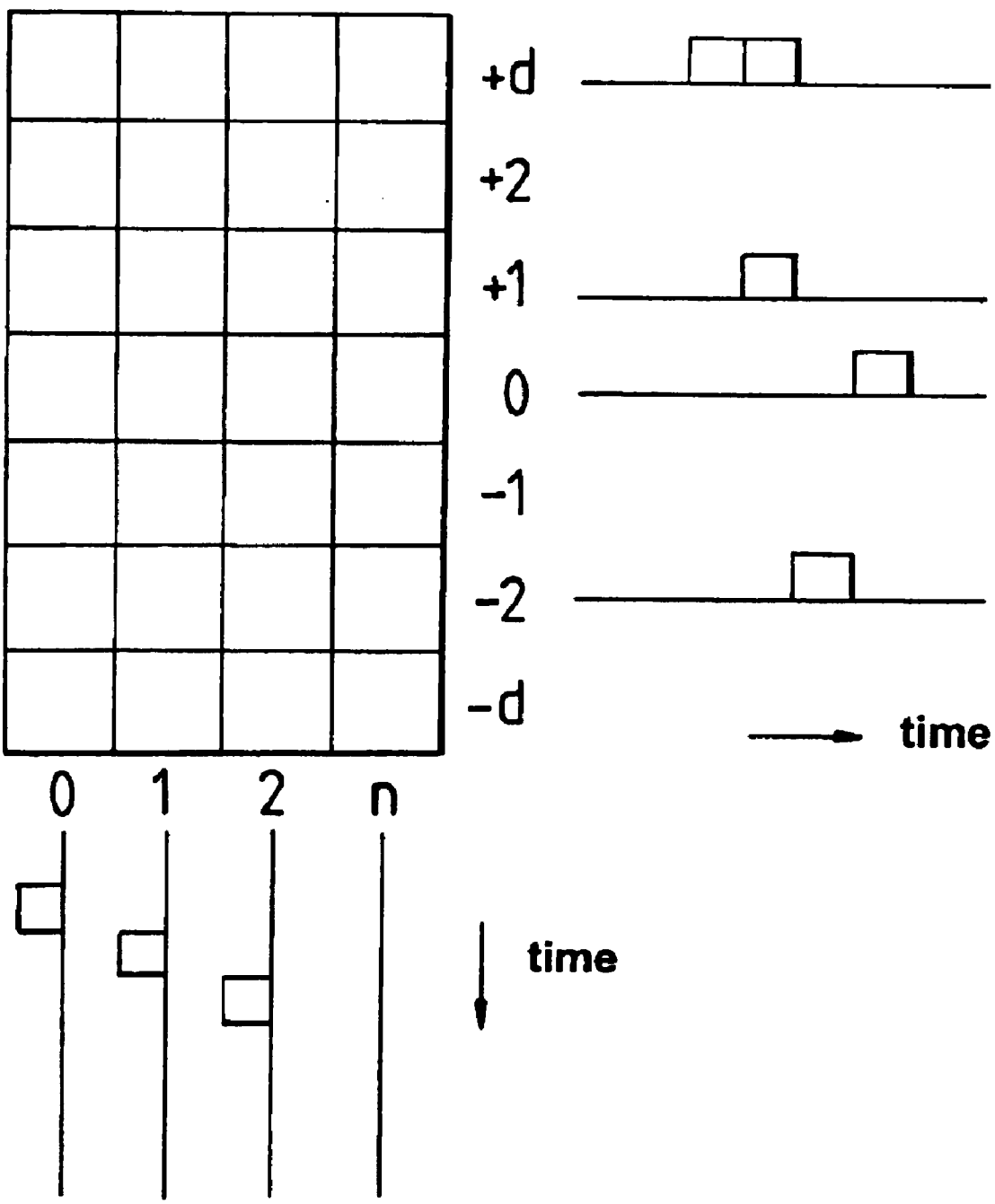
FIG. 14 shows the operation of the comparator.

The outputs from the correlator will take the form indicated in FIG. 14, corresponding to the sequence of matches between the data bitstreams and the reference bit. However, because of the need to remove the data-induced noise, as explained with reference to FIG. 14, the calculated offset values are fed into a sampler 36 which only updates the offset values if there is only one offset value at any given instant. Otherwise, the sampler does not update. Sampling timing is controlled by the frame sequence signal extracted from the correlator block.

The offset values output from the sampler or the instruction to maintain the previous values are output to the taps 37 of a controllable delay device whose input is the data bitstreams received from the FIFO buffer 34. In this way, the data output streams from the delay device are skew corrected.

The block 35 has been described in this section as a "correlator" but, as previously mentioned, in its simplest form the invention may contemplate simple comparison on a per-bit basis, bearing in mind that a comparator is a special case of a correlator with a 1-bit output rather than a numeric output. In this case, the individual offsets still need to be logic-OR combined to retrieve the bit identity clocks and it is still necessary to logic-OR combine the individual bit identities to obtain the offset clocks, as shown in FIG. 14. Generally speaking, a comparator is a special case of a correlator that is only necessary when the burst length is shorter than the comparator length.

Figure 19:
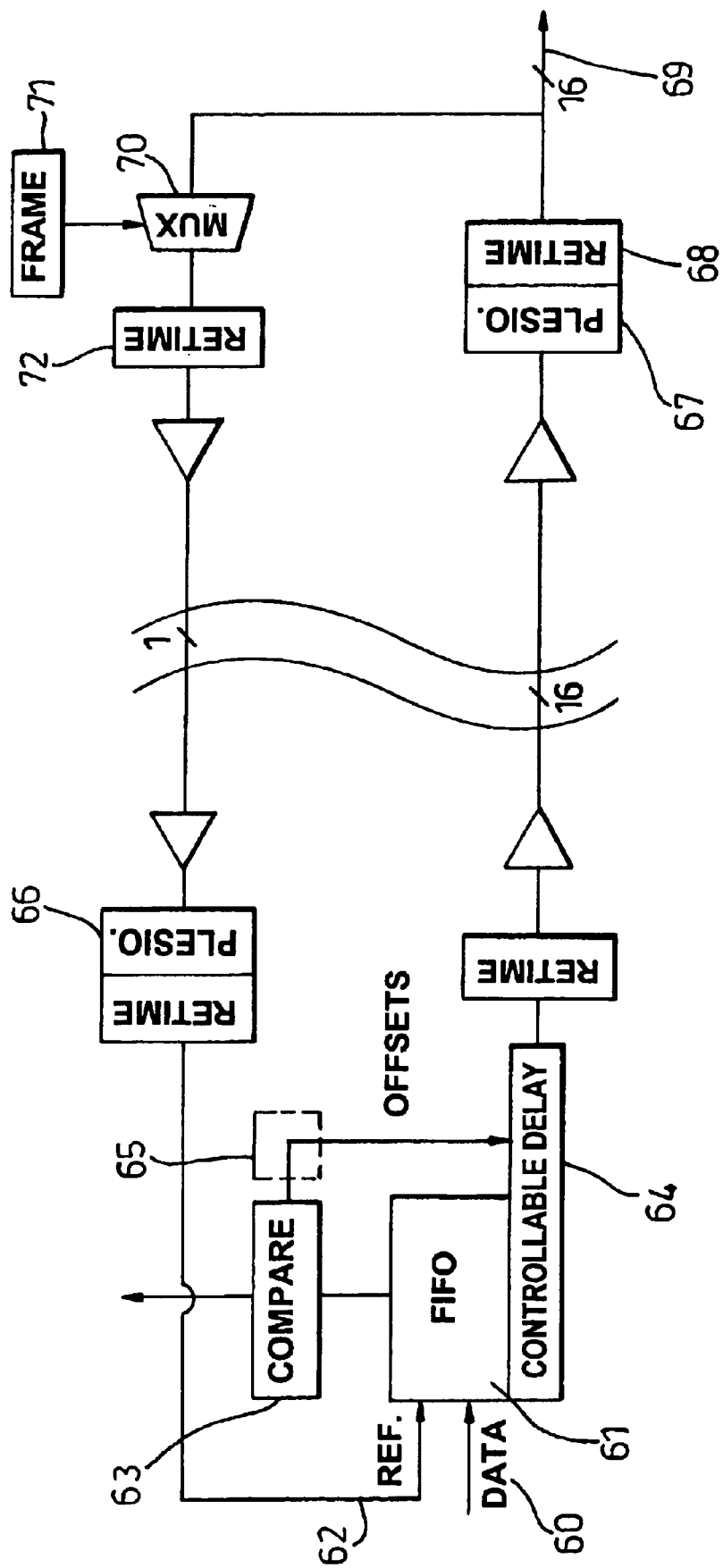
FIG. 19 is a diagram showing a reverse compensation embodiment.

In the form of the invention shown in FIG. 19, the skew detection/correction is carried out at the transmit end of a communication path in response to a reference bitstream generated at the receive end of the path.

In this arrangement, the data source 60 provides n (in this example n=16) parallel data bitstreams which are fed through a FIFO buffer 61 as in the previous embodiment but this time at the transmit side. The reference bitstream 62 is also fed into the buffer for correlation 63 with the data bitstreams to generate offset signals indicative of the required skew correction. The offset signals are passed to the controllable delay device 64 to adjust the relative time delays between the parallel bitstreams, as before. A sampler 65 may also be provided to compensate for noise, also as before.

The reference bitstream 62 is extracted from the reverse signal path from the receive side. If desired, the reference bitstream may be extracted by a plesiochronous receiver 66 and a re-timing circuit (made up of an array of D-type latches, for example) to overcome any timing errors not attributable to skew. The re-timing circuits may be dispensed with if the multiplexer used for generating the frame sequence does not introduce transients or gross skew components in the data.

At the receive side, the data bitstreams may be retrieved by a plesiochronous receiver 67 and optional re-timing circuit 68 and the data extracted at output 69. As in the previous embodiment, the data is also connected to a sampling multiplexer 70 controlled by a sampling sequence generator 71 to create the reference burst bitstream for reverse transmission to the transmit side where it is extracted for skew correction as explained above.

RAUDI Description—Error Detection

Since fractional skew is tracked by the plesiochronous interface and gross skew is continuously monitored and compensated for, any changes in skew are detected and compensated for without any external intervention and without error. In this respect, the performance of the RAUDI is limited by the ability of the plesiochronous interface to track fast changes in skew. In theory, this interface can track skew that has a rate of change that is less than 1-bit per bit period. When this rate of change is exceeded, errors may be introduced into the output data. These errors will be bursty in nature. This situation can be detected by the RAUDI and skew compensation will resume automatically without any external intervention. Note that this ability is achieved without any knowledge of the original data or any additional error detection circuitry. The mechanism that allows for the detection of errors is again the frame bit sequence. When the anticipated frame sequence is detected, but there has been a systematic shift in skew value associated with any bit identity, the rate of change of skew limit has been exceeded.

A further situation may be envisaged, as depicted in FIG. 13b, in which there is total loss of correlation in one of the bitstreams, in this example in bit-0. The frame sequence, as already described, enables the receive side to predict where the next correlation peak is to be expected. As shown in FIG. 13b, there is no detected peak when expected in bit-0. This is interpreted as a breakdown in the path associated with that particular bitstream. Where this path is an optical fibre, there could be serious health and safety implications if an operative were to look down a broken or disconnected fibre in which optical signals are still being transmitted. The present invention can be used, with negligible extra overhead, to signal back to the transmit side that a fault has occurred, requiring remedial action. In fact, the present technique is so powerful that it can signal back to the transmit side exactly which path has suffered a fault and can instruct the transmit side to disable a transmitter laser if the fault occurs in an optical fibre. This feature will be elaborated upon later.

When an unanticipated and total loss of frame occurs in this way and no frame can be identified for an extended period, a catastrophic failure has occurred somewhere in the path and the link has been lost. It is thus an optional feature of RAUDI that it can automatically (and without external intervention) initialise and re-establish the link and skew compensation as soon as the fault has been removed. This feature is useful, where the transmission medium may be disconnected for example if it is a cable with connectors. The RAUDI can make provision for signalling of both error and link loss events over a signalling path.

An expert implementer will be able to assign appropriate depths to the Input and Exit FIFO registers according to the required skew compensating performance. The interface can be regarded as in frame lock when sufficient data has been sent on the reference bit to correctly identify the sequence of bit transmission on the reference bit. The interface can fully skew compensate across all bits when the relative skew offsets for all data bits with respect to the reference bit have been derived reliably as described above.

Following skew compensation, the link can be regarded as established. Note that the interface as described can be symmetrical; the processes involved in one direction are applicable to the processes in the other (although the medium and its characteristics may be different or operate at different rates in an asymmetric system). Note also that it is not fundamental to the operation of the RAUDI that the data bits and the reference bit be transferred across the same communications channel, or indeed over the same type of medium. The use of RAUDI principals across complex combinations of media is thus not precluded.

It is possible to use multiple reference bits across the interface to improve performance e.g. initialisation time, if this is desired, but this is at the expense of the additional port overhead. The invention architecture, also caters for the partitioning of a single interface into multiple parallel sub-interfaces having the same RAUDI functionality should this be required. It also caters for nesting the interfaces within each other (i.e. where the implementation of the interface itself requires the use of RAUDI to achieve its own implementation). This nesting ability is particularly useful where the RAUDI implementation is distributed across diverse media and implementation technologies.

Furthermore, the invention allows for the automatic compensation of changes in skew between bits to various performance levels and accommodates various signalling options within the same scheme. There are many additional principals and modes of operation of RAUDI and these are described in subsequent sections.

RAUDI Description—Arbitrary Ordering of Data Bits in the Frame Sequence

The bit order sequence that constitutes the frame does not have to be fixed or known by the receiver and can even be changed dynamically. The transmission order and period can be arbitrary and even pseudo-random when it is only desired to effect skew compensation. Frame repetition is necessary however when it is desired to perform any predictive functions, such as predicting which bitstream is expected to correlate next so that errors can be detected.

Nor does the sequence need to be n bits long. Where the data bus is n bits wide, it can be greater than n bits in length if all bits are characterised but some are characterised more often than others. It can be shorter than n bits if only a subset of bits is characterised. For example, it may be known that certain bits are likely to be prone to error and so these can be sampled on a more frequent basis than other bits. This feature can be useful where individual data bits are carried over different media that have different skew properties. Where only a sub-set of bits are characterised a partial frame is detected. The repetitive element of the frame then only involves a sub-set of the bits and could be interpreted as frame loss. However, because a repetitive frame sequence is still being detected, this can also be interpreted as a partial frame. The final interpretation can be decided by the designer or the RAUDI link itself using acceptance thresholds.

The frame sequence can be changed dynamically without loss of payload provided the revised sequence is also repetitive and the change completes within the time-out used to identify frame loss. When a bit does not participate in skew compensation, errors occurring on this bit are not detected unless a separate error-detecting scheme is implemented. For this reason, a bit should not be dropped from the characterisation unless it is known to be free from errors to a high degree of confidence. This confidence can be established by keeping a record of which bits fell out of frame lock and hence were the cause of errors.

Where a signalling path is provided from the receive side to the transmit side, it is possible to signal the identifications of bits that require particular attention, even while the link is running, and thereby fully exploit the ability to vary the frame sequence. In this way, the receiver can request a particular frame sequence of the transmitter, based on historical measurement of the link.

RAUDI Description—Burst Samples of Arbitrary Length and Varying Length

The burst sample length from an individual bit does not have to be fixed or known between transmitter and receiver. The receiver can still derive the burst length by tracking the transmission bit sequence. Where the skew to be compensated is long, it is desirable for the burst length to be long. This allows the skew to be quickly identified and removed. However once the skew has been compensated, the application may require minimisation of the response time to identify errors. This response time can be reduced by reducing the burst length.

Note that in certain circumstances, if the burst size is reduced the correlators may never reach their maximum value. However, if a numerical output is available, this will still be seen to peak at some level below maximum.

RAUDI Description—Multiple vs Single Correlator and Correlator Length

By using multiple correlators running in parallel an increase in implementation complexity can be traded for reduced initialisation time and error detection response time. Equally, longer characterisation and error response times can be traded for reduced implementation complexity if a single correlator is repeatedly used.

Compensation for long overall skews does not necessarily result in the proliferation of correlator implementation complexity. By keeping a long counter as a coarse timing reference, the correlation for a bit can be built up over time by successive applications of a shorter correlator until all of the required sequence has been observed. Note that such repeated application of a less complex implementation will result in longer times to initialise the link and a slower response time for error detection.

It is also important to note that comparator(s) may be substituted for the correlator(s) where it is only required simply to determine that a match exists, rather than necessarily measuring the extent of that match, e.g. for basic skew compensation only.

RAUDI Description—Discontinuous Transmission Over the Reference Bit

Once the initial skew compensation has been achieved, the reference bit can be turned off for a period of time. In this mode, the receiver must assume that the skew offsets are still valid, and continue to free-wheel open-loop until framing activity on the reference bit resumes. As long as the rate of change of skew is less than 1 bit per bit period and the medium does not corrupt data, the interface will remain in perfect operation. Even if one of these events does occur, normal operation will resume immediately upon restoration of the reference bit although the events are only detectable if the framing sequence detects that the gross skew has changed. Because the reference bit has these properties, the medium used to transfer the reference bit can be of lower integrity than the data bits and again this allows distributed implementations.

It is desirable periodically to re-establish transmission on the reference bit to ensure that the skew parameters are unchanged. Note that while the reference is inactive, errors might not be detected within the RAUDI unless a separate error detection scheme is employed. This mode of operation is useful for at least two purposes; the first is to conserve spectrum or power and the second is to use the reference bit for other data. While the reference is not used for characterisation it can be used for other purposes, such as: sending additional payload; signalling; further parity calculation; or for sharing the reference bit between a pair of interfaces forming a full duplex arrangement. Where the reference bit is used for signalling it is by time division multiplexing on the reference path and the protocol must be rigorously defined so that both halves of the interface agree the intention of any signal.

It is a matter of configuration or negotiation within the RAUDI as to whether the receiver free-wheels in the absence of the reference bit information or whether it signals an error or loss of link. Where the receiver is allowed to free-wheel, the reference bit information must be restored before the frame loss threshold is reached.

To explain this further, reference is now directed to FIG. 14. It must be appreciated that during the time that the correlator is processing the data from one bitstream relative to the reference bit, there will be no correlation output between the reference bit and all of the other bitstreams. The non-correlated outputs will constitute noise that must be eliminated from forming a basis for updating the skew correction parameters. Under these circumstances, the rolling total peak correlation values of these other bitstreams will gradually fall. As long as there is no major change in the skew of the respective bitstream paths, the skew values can safely be held at their previous values. In other words, it is safe for the correlator to freewheel until some policy threshold is compromised (could be never).

Referring to FIG. 14, the grid again represents bitstreams 0 to n in the columns and possible offset values ranging between d and +d through zero in the rows. In this example, data on bit-2 is assumed to have a corresponding offset of zero. The data on bit-1 has an offset of 2 and that on bit-0 an offset of +1. The data on the bit with an offset of +d is shown as having two occurrences, one in time synchronism with the data on bit-0 with the offset of +1 and the other delayed by one bit interval.

The manner of operation of the system, by which sample bursts from the bitstreams are taken by the frame sequence generator, makes it impossible for a correlation match to occur between two bitstreams at the same instant Therefore, the pulse indicated on the offset +d row in FIG. 14 can only arise from noise induced by data in the other bitstreams. Therefore, when this situation occurs, the offset values used to adjust skew are not updated but instead the values are held from the previous frame period.

RAUDI Description—Signalling Mechanisms

Signalling is an optional feature that may be implemented alongside the skew compensation scheme. The signalling methods described here make use of the data and reference bits but in a way that does not affect the payload or payload continuity. The ability to pass signalling information across the interface can be vital to ensure that the interface itself is aware of its own status, can request actions within itself and signal status to higher level functions. These higher level functions ultimately have knowledge of the overlying payload format and so are able to insert link status information into the payload if this is required (e.g. SONET overhead). The RAUDI is thus able to maintain its agnostic capability without compromising any payload specific signalling requirements.

Signalling can be provided within the interface without the need for a separate signalling path. The kind of signalling that will be useful relates firstly to signalling of link status i.e. if a receive link has been established correctly this can be signalled back to the transmit side on the reverse interface. Similarly, loss of link can be signalled back to the transmit side and it is a matter of policy as to what actions result from these messages.

Another type of signalling relates to exchange of commands between the two halves of the interface, either to force particular modes of operation or to exchange parameters between the two sides.

Figure 16:
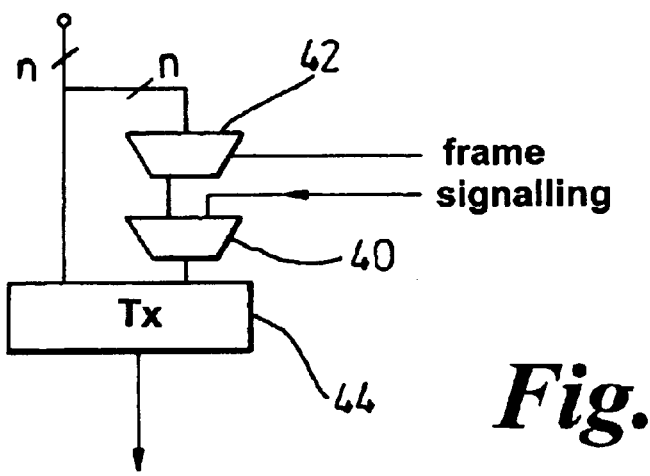

One type of signalling mechanism is the use of TDM over the reference pin. An example of such signalling is depicted in FIG. 16. In this method, messages are interleaved with the burst samples (as permitted by discontinuous transmission of the reference bit) by means of an additional time division multiplexer 40 inserted between the first, frame sequence time division multiplexer 42 and the transmit drivers 44.

Figure 17A:
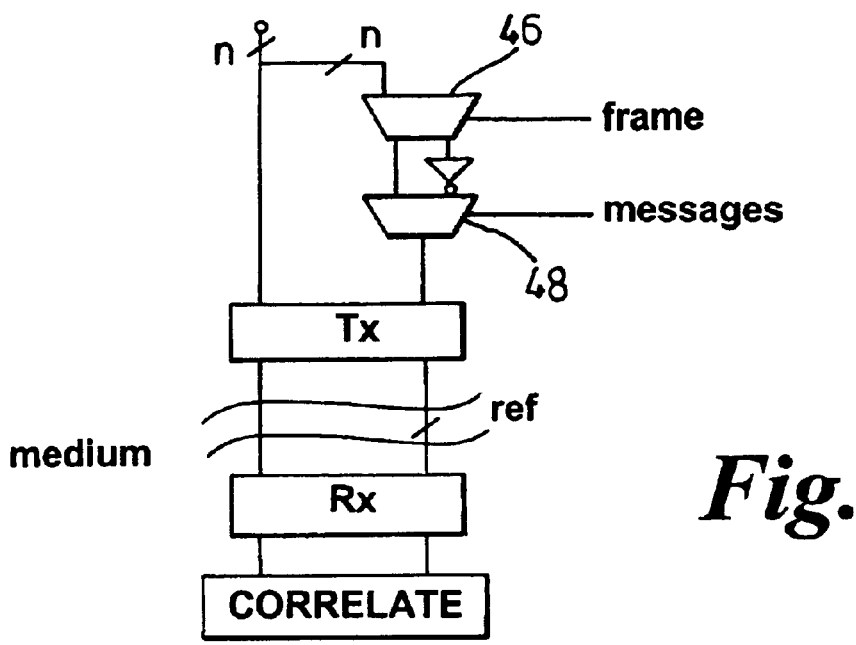
Figure 17B:
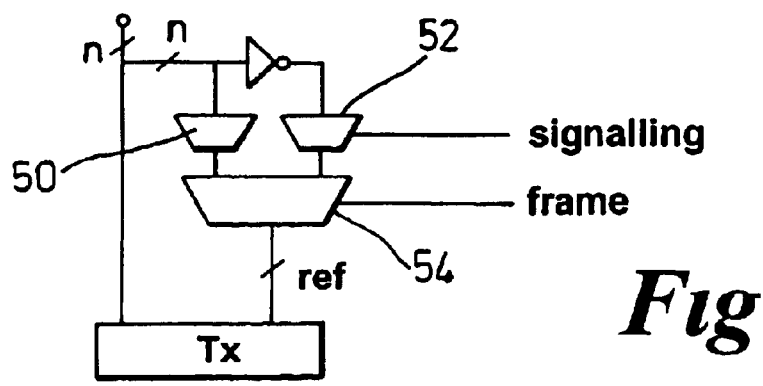

Another method is to modulate the reference pin data according to desired signalling messages. This method is depicted in FIG. 17, which shows two different implementations of the method. In one implementation, as shown in FIG. 17a, the data samples from the frame sequence multiplexer 46 are passed over respective direct and inverted paths to a second multiplexer which 48 is controlled according to the output of the message generator (not shown). Alternatively, as shown in FIG. 17b, the payload data is passed direct or inverted to respective multiplexers 50, 52 to the frame sequence multiplexer 54. The message input controls the multiplexer connected to the inverted data payload.

For such phase modulation of the reference pin to work as a signalling mechanism, each message must have a unique pattern of data bits pre-assigned. For example, a logic 0 may indicate send the reference as-is and a logic 1 may indicate invert the reference bit (the reverse meaning is possible). The message is then queued up for transmission. As each burst sample of a bit is sent, it is now selectively inverted (according to the above rules) for the duration of the burst, such that the bursts that make up the reference are phase modulated versions of the original, the pattern of modulation matching that assigned to the message. It can be seen that the comparators will now detect a mixture of negative comparison (fully mismatched) on some bits and positive comparisons (fully matched) on others, the pattern being that associated with the original message. Note that the offset information and associated bit identity information is still carried, even in the presence of a message.

Another technique is possible which does not phase modulate the reference until the original payload data matches the pattern of the message to be sent. Since this technique is inherently slow, it is not the most preferable technique.

If the correlation block is configured for detecting both positive and negative correlation peaks, two distinct meanings for the data bits are created that can be used to flag the presence and meaning of signalling messages. If only positive correlations are present, this indicates that there is no message being sent. If there are mixtures of positive and negative correlations, this indicates that there is a message being sent and the distribution of positive and negative correlations across the bits represents the message pattern. Where the number of bits in the data bus is n, it is possible to define a message space that is $2^n$ messages long (including the no message present message). Each of these messages can have parameters associated with them. These options are illustrated in FIG. 18.

It is possible to combine the phase modulation and TDM signalling methods into a further method, the phase modulation carrying the message and the TDM carrying a numeric value. It is convenient to use this method to pass numeric parameters that are associated with particular messages. For example, a message can be sent that reference is going to be removed and the parameter can indicate the number of cycles for which the reference will be removed. In this method, the messages are signalled by sending the true value of the data and the parameters are sent using the TDM technique.

| Message | Parameter |
|---|---|
| Remove bit from frame sequence | bit n |
| Permit reference turn-off for | r bits duration |
| Shift to compensation regime | C |

-continued

| Message | Parameter |
|---|---|
| Poor integrity on | bit n |
| reliable integrity on | bit n |
| send parity | bit n |
| Volunteer | optional capabilities |
| Volunteer | vendor specific capabilities |
| Send | vendor code |
| Request | to be slave |

In this context a regime is a set of characteristics defined by a number of parameter values. The use of regimes is a useful method for conserving the messaging space, particularly if the number of data bits is small. Where the messaging space is severely restricted, it must be reserved for mandatory messages of which there is currently only one which is the same as the no signalling case, namely no message. This message does not thus have a complexity overhead unless signalling is being used.

It can be seen that if many messages and their parameters need to be passed sequentially, the process can be time-consuming. This is another reason for using regimes. The signalling mechanism is not just specific to the link between RAUDI devices, but can be used for forwarding messages along a daisy-chain of devices, such as sub-marine repeaters.

RAUDI Description Fractional Skew Compensation on the Transmit Side

A modification of the system described above with reference to FIG. 19 that takes advantage of the signalling mechanisms described in the previous section will now be described with reference to FIG. 20.

It will be recalled that there is a symmetry in the RAUDI that permits gross skew compensation to be performed at the transmit side. Under these circumstances, fractional skew compensation is carried out by the plesiochronous receiver 67 (FIG. 19) on the receive side. By contrast, the embodiment in FIG. 20 enables fractional skew compensation to be performed at the transmit side, thereby relieving the receive side of all means to effect skew compensation.

Figure 20:
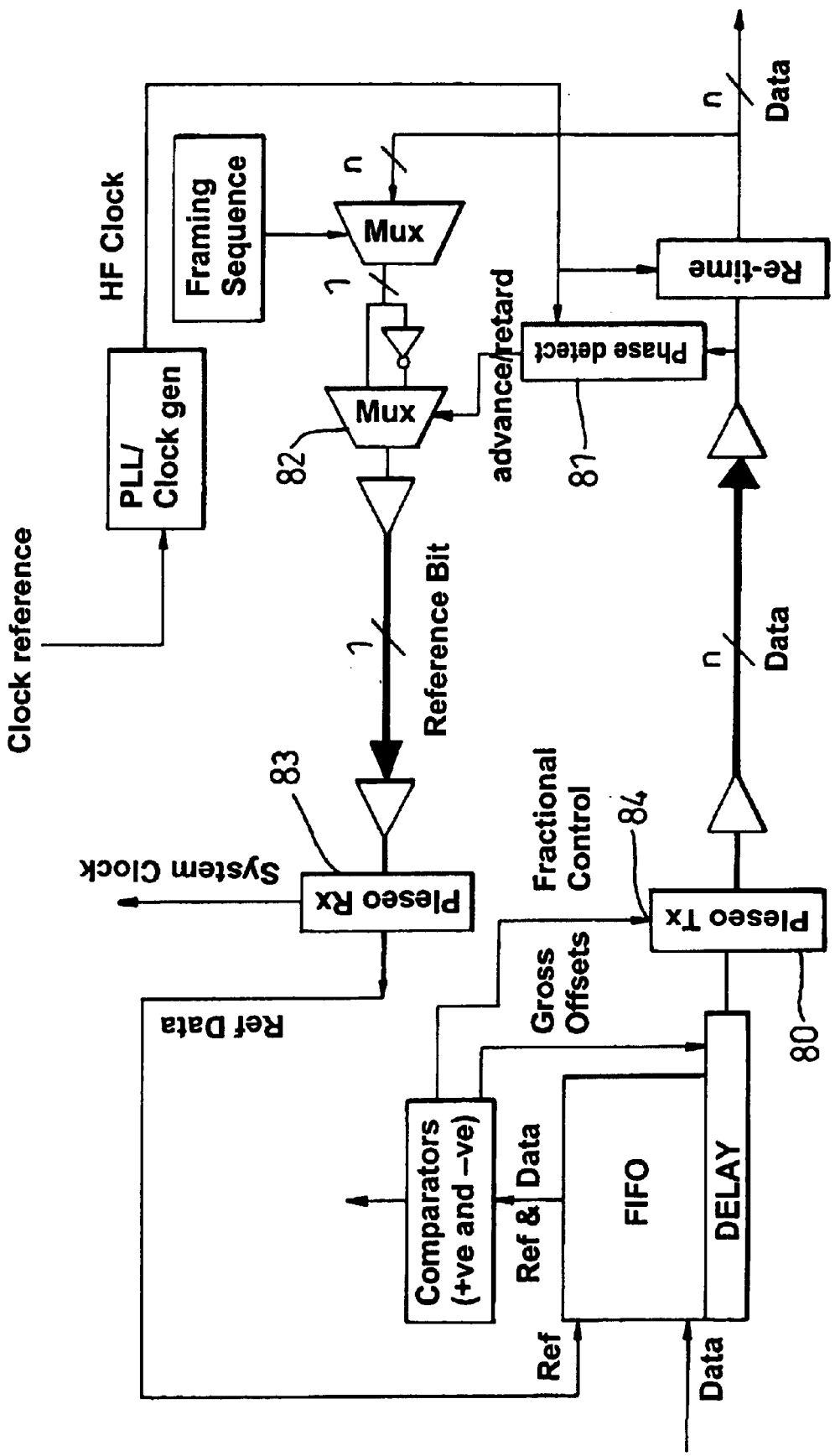
FIG. 20 is a diagram showing a variation of reverse compensation that transfers skew compensation to the transmit side.

As shown in FIG. 20, the same component blocks as in FIG. 19 are given the same reference numerals whereas the blocks peculiar to the modification are given reference numerals in the 80s. The plesiochronous receiver 67 has been removed from the receive side in FIG. 20 and replaced by a plesiochronous transmitter 80 at the transmit side. As in FIG. 19, the output from comparator block 63 is used to control the controllable delay 64 but this time in respect only of the gross skew offsets. A second set of outputs from the comparator block 63 is used to control the plesiochronous transmitter 80 as regards fractional skew.

At the receive side in FIG. 20, the n parallel data bitstreams pass through a retime block 68 (such as a re-timing register), as before but, in this modified embodiment, the bitstreams are also connected to a phase detector 81 whose output is used to signal the required advance or retard of the respective bitstreams. The output provides the control input to a multiplexer 82 located downstream of the frame sequence multiplexer 70 and in place of the retime block 72 shown in FIG. 19. The multiplexer 82 forms part of a suitable signalling mechanism, preferably one of those previously described. The receive side retime block 68 and the phase detector 81 are both now controlled by a high frequency clock derived from a clock reference source (not shown).

As in FIG. 19, the n parallel digital data bitstreams that are output from the receive side are fed back into the frame sequence multiplexer 70 to generate the reference bit-stream for reverse transmission to the transmit side where it is received by the plesiochronous receiver 66 in order for the reference data to be extracted and used in the transmit side FIFO 61 as before.

In this way, the plesiochronous transmitter 80 deliberately introduces an amount of fractional skew distortion into the n data bitstreams which exactly compensates the fractional skew distortion encountered by the data streams in the path between the transmit and receive sides. The eyes of the data will then be appropriately aligned with the synchronous re-timing register 68 in the receive side so that both fractional and gross skew are removed, gross skew being corrected by the RAUDI process.

The position of the data eyes relative to the clock is monitored by the phase detector 81 in order to establish when they are aligned. The phase detector therefore produces output values indicating whether the data is too early, too late or unknown. These values form the signals transmitted back to the transmit side by the signalling mechanism. In order to ensure that both gross and fractional skew information is sent back simultaneously, the preferred signalling mechanism is that previously described with reference to FIG. 17a and 18. This has the added advantage that, as the bus width increases, the error values are not degraded as would be the case with TDM type signalling. It is also possible to send these fractional skew control values on a dedicated port to the plesiochronous transmitter 80 if the port overhead can be tolerated. This would then permit alternative non-digital implementations and the transfer of skew quantities rather than shift direction alone.

The preferred signalling mechanism requires both positive and negative comparisons (ie exact matches and exact mismatches) to be undertaken in the comparator array 63 at the transmit side. As already noted, the comparator 63 therefore outputs gross skew values to the delay 64 and fractional skew values to the plesiochronous transmitter 80.

Figure 21:
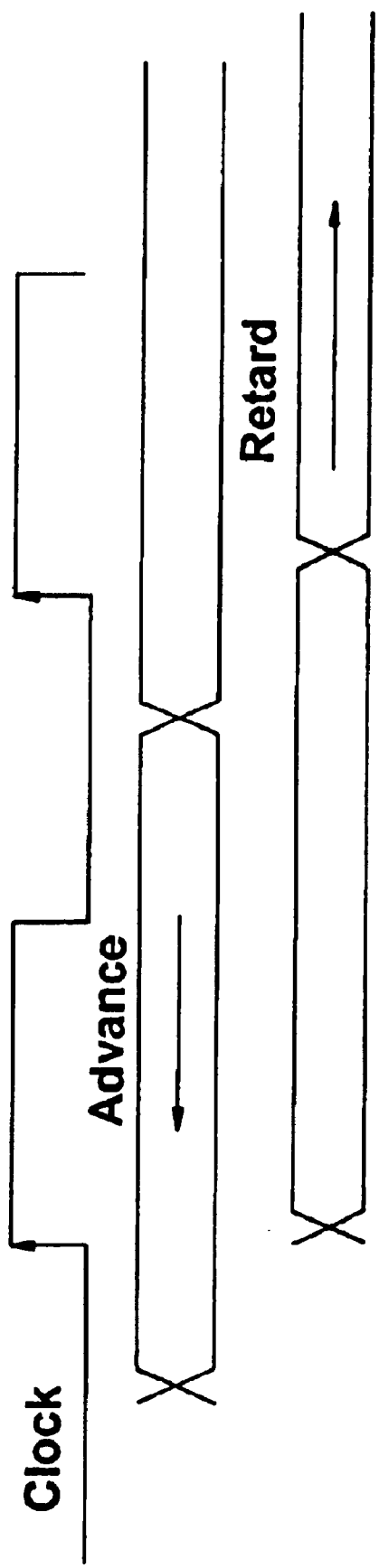
FIG. 21 is a phase diagram.

It should be noted that the fractional skew values are not absolute values but are relative values representing whether the phase should be advanced or retarded from its current position. This concept is shown generally in FIG. 21 where the phase displacements of two bitstreams relative to a clock frequency are schematically illustrated.

Figure 22:
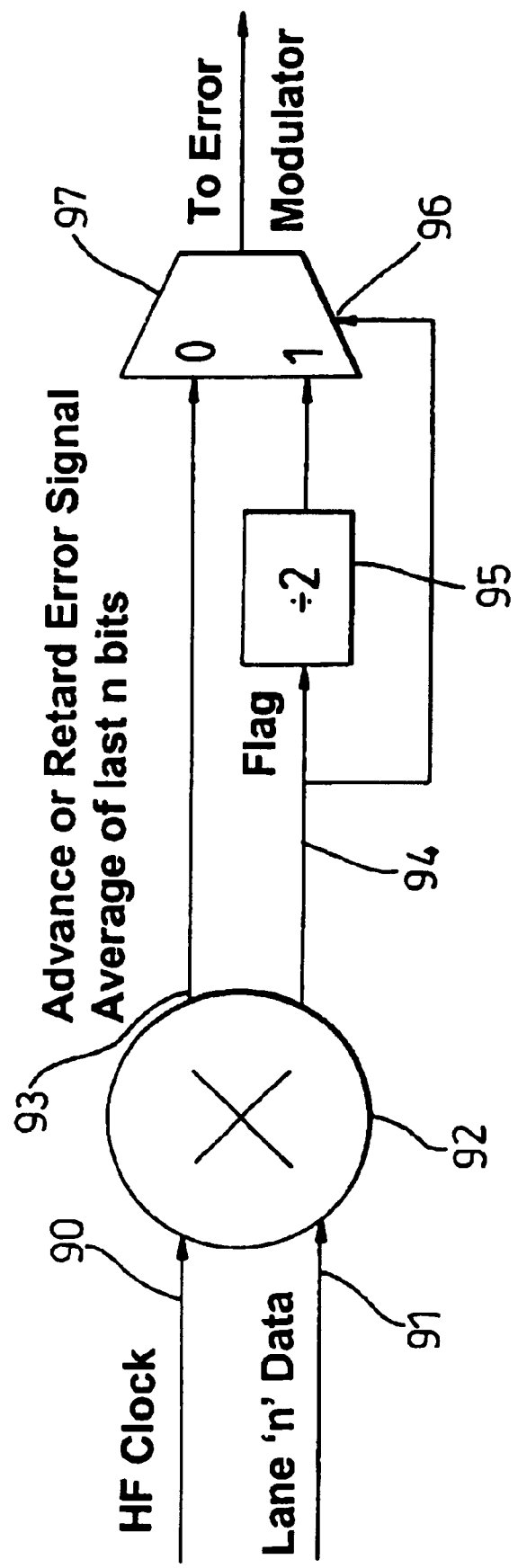
FIG. 22 shows an exemplary phase detector.

A possible configuration of the phase detector 81 of FIG. 20 will now be described with reference to FIG. 22. One such detector is required for each of the n data bitstreams. Consistent with FIG. 20, a high frequency clock (HF Clock) is connected to one input 90 of a phase detector 92 whose other input 91 receives data from one of the n parallel bitstreams. The detector 92 evaluates whether or not the clock and the data streams are in phase (see FIG. 21) and produces an advance/retard output 97 which will be signalled back to the transmit side.

The data in each lane is random and is likely to be of NRZ form. There are therefore three possible states that the detector 92 has to evaluate, namely the data is ahead of the clock, the data lags the clock or the phase is unknown or unknown. The third state obtains if there are no 1-to-0 or 0-to-1 transitions in the data during a measurement period.

In order to ensure that there are sufficient transitions in the signal and to prevent inappropriate signalling information, the detector 92 produces a flag output 94 whenever there are no transitions detected over a measurement period. This output is connected via a simple state machine, such as a divide-by-two circuit 95, to the 1-input of a multiplexer 97 and direct to a control terminal 96. The advance/retard output of the detector 92 is connected to the 0-input of the multiplexer 97 in order to produce a binary-1 or binary-0 representing one or other of the first two states mentioned above. If no transitions are detected, the no-transition flag is set high. This condition takes precedence over either of the other two states which would otherwise signal invalid phase information during that period. Therefore, the control input 96 ensures that the advance/retard signal is suppressed when the no transition flag is set high. The state machine 95 ensures that, when the third state obtains, the error signal alternates between up and down in such a way that the average over the measurement period is half the value of the up or down value.

Because of the likelihood that the signalling multiplexer 82 (FIG. 20) will accept one error signal per data lane every n bits (in the case of an n-bit bus) the phase detector outputs an average error signal over the previous n bits. This averaging also helps reduce the bandwidth requirement.

An exemplary configuration for the plesiochronous transmitter 80 (FIG. 20) at the transmit side will now be described with reference to FIG. 23. One such transmitter will be needed for each of the n bitstreams. The purpose of the control loop, of which the phase detector in FIG. 22 forms part, is to minimise the phase difference between the data and clock at the input to the phase detector in FIG. 22. The data from one of the bitstreams is input 100 to a circular buffer 101 and output 102 after the phase has been adjusted by suitable control of the write-in/read-out rates.

In order to achieve this control, data is written into the buffer at the system clock rate at 103. This system clock could, for example, be extracted from the plesiochronous receiver 83 at the transmit side as shown in FIG. 20. The data is read out at an adjusted clock rate at 104. This adjusted rate is derived from a reference clock 105 in dependence on the phase error signal 106 which is equivalent to the fractional control signal indicated at 84 in FIG. 20.

This error signal is processed in a phase control state machine 107 to generate a phase control output 108 which is used to adjust the phase of phase shifter 109. The phase of the reference clock 105 is thereby adjusted until the phase error is minimised.

Figure 23:
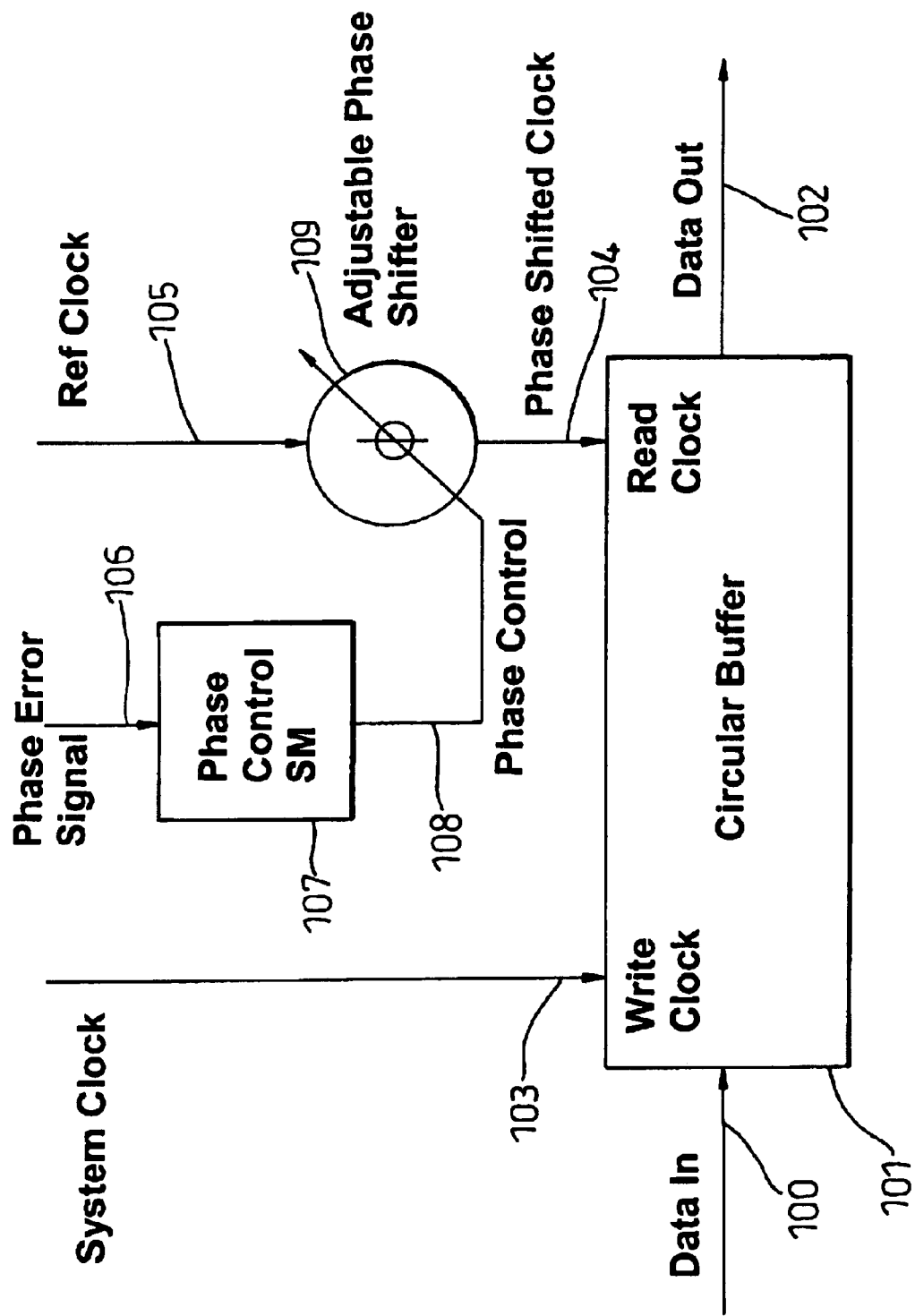
FIG. 23 shows an exemplary plesiochronous transmitter.

Although the FIFO buffer in the transmit side of FIG. 20 has been illustrated and discussed as being a separate entity from the circular buffer 101 (which may also be a FIFO buffer) in FIG. 23, it is possible that the two buffers may be combined into a single entity.

In the configurations described above with reference to FIGS. 19 and 20, skew correction is carried out at the transmit side in response to a reference bitstream reverse transmitted to the transmit side from the receive side and used at the transmit side in a comparator/correlator process to derive offset indicative signals that can then be used in a controllable register or FIFO to correct the detected skew. On the other hand, in the configuration described with reference to FIG. 10, the reference and data bitstreams originate at the transmit side and all skew detection and correction is carried out at the receive side.

However, it will be clear to the skilled man that these configurations can be further modified to take advantage of the symmetry inherent in the RAUDI. In particular, a configuration can be envisaged in which the comparison step between the reference bitstream and the data bitstreams can be carried out at the receive side and the results of that comparison reverse transmitted to the transmit side to effect skew correction. This variation can also be applied to the FIG. 20 configuration where it may be considered desirable to use gross skew correction at the transmit side, even though the phase detector arrangement in FIG. 20 accounts for fine skew compensation at the receive side. Similarly, the FIG. 19 configuration can be modified in the same way.

RAUDI Description—Dynamic Parameter Changes

As discussed, some parameters e.g. reference bit burst duration, can change dynamically depending on the current status of the link. Such parameters may be fixed for implementation simplicity or can be continuously varied to achieve specific performance requirements. It is most likely that the use of dynamic features can be best employed in (but not restricted to) vendor-specific implementations and regimes where knowledge of the application is of value.

Other parameters that have dynamic application are correlator length, and the frame bit sequence.

RAUDI Description Avoiding Correlation of the Reference Bit with Multiple Samples In the basic mode of operation, it is assumed that either the individual data bits are not correlated with one another, that they are scrambled to avoid correlation or that data-induced noise is removed in the correlator or comparator (see the description relating to FIG. 14, for example). It is possible, however, to exploit the known feature that the frame sequence can be changed dynamically to ensure that data bits that are next in line to be sampled to form the reference bit are not themselves correlated with the reference.

Figure 24:
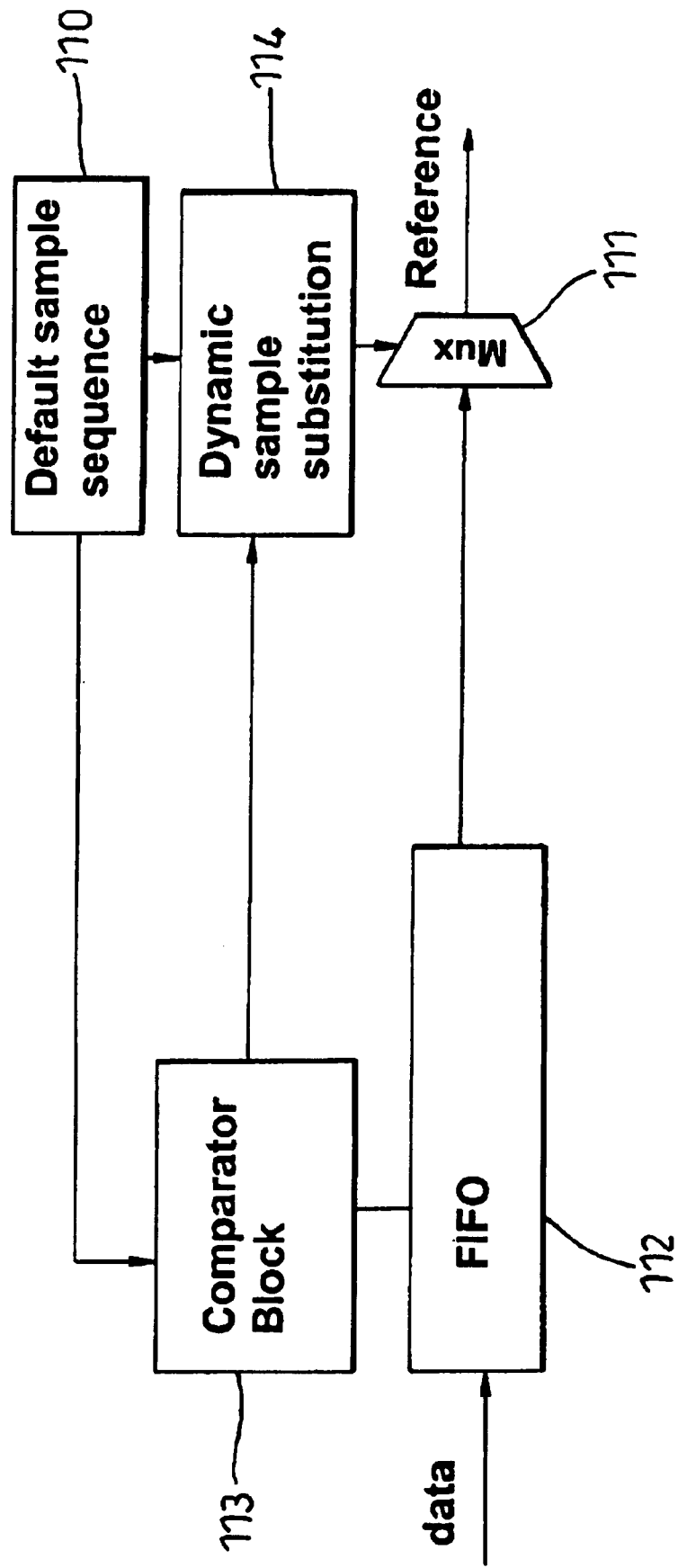
FIG. 24 illustrates schematically an exemplary frame sequence generator.

Referring to FIG. 24, a technique is illustrated for substituting a different frame sequence under certain circumstances. The figure shows a typical reference bitstream generator that could be used in any system according to the invention, such as that described with reference to say FIGS. 15, 19 or 20. The sample sequence 110 is nominally fixed, although it should be clear that the sequence can readily be changed as desired. The sequence is normally supplied to the sampling multiplexer 111 located downstream from a FIFO 112 that receives data from the data streams. The sample sequence is also connected to a further comparator 113 that compares the current burst with the burst about to be sent. If it detects a match, that would result in false correlation at the receive side, the comparator 113 outputs a command to a block 114 to substitute a different sample burst for the burst about to be sent. The substituted sample is selected so as not to lead to a false match. The principal advantage of this technique is that offsets identified in the receive side comparator are always genuine, so sampling and/or integration complexity within the loop may be avoided.

RAUDI Description—Scramblers and Control of Scramblers

Scramblers can serve three purposes within the RAUDI system that can be implemented within the RAUDI or outside the RAUDI where the desired function is already implemented elsewhere in the data path. In order to make the RAUDI generally applicable all necessary scrambler functions can be implemented inside the RAUDI. From an implementation point of view it is desirable to share these functions wherever possible. Making the scramblers programmable depending on their context is also advantageous.

Scramblers are used to:

ensure a minimum transition density at the input of the plesiochronous receiver;

reduce the number of correlations between individual bit-streams; and optionally manipulate the spectrum of the medium.

Two types of scramblers are in general use and applicable here, namely the synchronised scrambler and the self-synchronising scrambler.

The self-synchronising scrambler does not require the transmit and receive scramblers to be externally synchronised by the state machines but does introduce longer bursts of errors than synchronised scramblers. To get the error benefits of the synchronised scramblers the transmit and receive scramblers are then synchronised by a control output from the state machines. The state machine derives the correct moment to synchronise scramblers from the RAUDI frame.

For certain levels of performance, the use of an anti-correlation scrambler is not required, but initial acquisition of offsets may then take longer.

Applications

The system is of particularly valuable application to the following:

Data transmission between devices where the skew between bits is not well controlled or is variable, including both fixed and ad-hoc connections.

Data transmission within an individual device, where the skew between bits is not well controlled or is variable e.g. in Integrated Circuit design.

This can allow transport of data across a device where the transit times and skews are an issue to normal synchronous operation. Asynchronous operation can be employed to overcome this issue but the data throughput is thereby compromised. The RAUDI allows continuous data transmission.

The design is applicable to electrical as well as optical or photonic and other media interfaces. In the photonic case, skew may be removed between different wavelengths of light using exactly the same principles.

In the photonic case, it is envisaged that packet-based or any arbitrary data or signalling data can be re-aligned successfully across fibres or individual wavelengths without transferring to an electrical interface. RAUDI techniques can thus be applied to aggregate and separate data streams directly even if in the presence of timing uncertainty.

Operation can take place across media that contain repeaters or medium translators with or without termination of the RAUDI interface within the repeater itself. It is thus possible to de-skew distributed interfaces even if the components comprising the media are unaware that they are participating in the skew compensation function. In such situations, the total end-to-end skew is compensated for, which includes all skew contributions from different media or repeaters. It can thus also be seen that, if an implementation of RAUDI is unable to compensate for the total end-to-end skew of a given path (i.e. it has restricted skew capability), more than one RAUDI interface can be used in series until sufficient skew compensation has been achieved i.e. skew performance is additive, not degraded by sequential application of the interface. As previously mentioned, submarine repeaters are particularly open to use of the present invention.

When a repeater is RAUDI aware and terminates the RAUDI function, signalling may be daisy-chained if required. In this way messages are not just specific on link between RAUDI peers, they can be used to signal across a broader network.

Scope

Within the scope of this invention there are a number of parameters and features that can be varied or selected (statically or dynamically) or which can be used in different combinations to achieve an interface with the required performance characteristics and implementation complexity. This allows an expert implementer to choose which features and parameter values are required to achieve an interface and make trade-offs within overall performance requirements and complexity constraints. It is not possible to cite exhaustively all such combinations and values. However the contribution that each makes to performance and complexity is described.

Although the possible configurations are many and diverse the individual building block functions that contribute to the flexibility of the invention are defined to the point where they can be implemented by the skilled implementer and the techniques adopted are specific. Some example application scenarios to emphasise these points are as follows:

One scenario may require 1000 bits of skew compensation across a 128 bit interface with no restriction on the time required to establish a compensated link or hardware complexity. The scenario here lends itself to the use of a single reference pin across all 128 bits.

Another scenario may require 1000 bits of skew compensation across a 128 bit interface and fast establishment of the link. In this case, it may be better to sub-divide the interface into 8×16-bit interfaces each with its own reference pin and take the penalty of the extra reference pins.

Another scenario may be highly pin count sensitive requiring the reference pin to be shared between transmit and receive sides (an average of 0.5 reference bits per direction). In this case, a bi-directional reference pin and signalling scheme can be adopted. If a flow control mechanism is available at the next level up in the hierarchy, the data pins can also be shared between transmit and receive sides of the interface if they are made bi-directional connections and a half-duplex arrangement constructed. In this scheme, the reference pin functionality is preserved.

As should now be clear, the techniques described here are applicable to all media types including but not limited to electrical, wireless and optical media.

Another scenario is where the application requires very low power and the power of the medium transmitters is dependent on activity and frequency (e.g. CMOS). In this scenario, it is possible to sacrifice tracking of high rate skew changes (>1 bit/bit period) by turning the reference off for extended periods and allowing the receive algorithm to free-wheel.

Interfaces that are unidirectional and bi-directional (full-duplex) can also be implemented with the present invention.

In this specification, 'data' means any arbitrary combination of payload and signalling.

'Payload' means data that is specifically application/user data not introduced by the link itself.

'Signalling' is data that is specifically introduced by the link itself in order to send messages.

Degrees of Freedom Within the Basic Design

One of the advantages of RAUDI is that it has a number of degrees of freedom (degrees of flexibility) from which an expert implementer can choose to make the correct design trade-offs. These include:

Multiple signalling methods.

Bus width

Magnitude of the skew tolerated.

Depth of the receive FIFO buffer.

Width of the receive correlator(s).

The duration for which each bit is sent to the reference and the coding of this e.g. bit sequence may be inverted prior to transmission.

The burst duration for the synchronisation information.

The protocol for sharing synchronisation and payload/signalling on the reference bit.

The content of the reference when synchronisation information is not sent (e.g. payload or signalling data).

The order in which bits are sent to the reference.

The scrambler function.

Multiple reference bits may allow additional functionality/performance if the port overhead can be tolerated.

What we claim is:

1. A digital data communication system incorporating means to detect skew between n parallel digital data bitstreams relative to one another, the system comprising;
    a multiplexer arranged to sample bursts of data from said n parallel bitstreams according to a sampling sequence to form a reference bitstream;
    a driver arranged to insert said n parallel bitstreams and said reference bitstream into a signal path;
    a receiver arranged to retrieve the n parallel bitstreams and the reference bitstream from the signal path;
    a reference bitstream extractor arranged to recover the reference bitstream; and
    a comparator arranged to compare said extracted reference bitstream with said n parallel data bitstreams to produce outputs indicative of the offset of each of said parallel bitstreams relative to said reference bitstream.

2. A digital data communication system according to claim 1, wherein said path comprises a transmission channel.

3. A digital data communication system according to claim 1, wherein said path comprises a storage device.

4. A digital data communication system according to claim 3, wherein said storage device comprises a dynamic recording and playback device, such as a tape or disk recorder.

5. A digital data communication system according to claim 3, wherein said storage device comprises a static storage device, such as a random access memory.

6. A digital data communication system according to claim 3, wherein said path comprises a computer network.

7. A digital data communication system according to claim 1 and further comprising a corrector to correct skew between said n parallel data bitstreams in accordance with said offset indicative outputs.

8. A system according to claim 1 wherein the comparator comprises a correlator arranged to correlate the data bitstreams with the reference bitstream over a plurality of spaced time intervals.

9. A system according to claim 1 further comprising scrambler means to scramble the bitstreams prior to insertion in the said path.

10. A system according to claim 9 further comprising a descrambler arranged to descramble the bitstreams recovered from the path.

11. A system according to claim 8, wherein the correlator comprises:

an input FIFO buffer connected to receive the n parallel data bitstreams and the reference bitstream from the path;

at least one correlator connected to receive time-spaced samples of the data bitstreams passing through the input buffer and to compare them with the reference bitstream passing through the input buffer, whereby to produce offset outputs representative of the closeness of the match between the reference and the data bitstreams.

12. A system according to claim 11, further comprising a controllable delay device arranged to adjust the relative timing between data bitstreams in accordance with said offset outputs, whereby to correct the received data bitstreams for skew.

13. A system according to claim 12, further comprising:

a sampler having:

an input connected to an offset output of the correlator, said offset output representing the required amount of skew correction;

an output connected to a control input of the said controllable delay device; and a control input controlling the passage of offset values between said offset output and said control input of said controllable delay means;

the correlator having an output arranged to extract a signal corresponding to the sample sequence used by the said multiplexer to form the reference bitstream; and said correlator output connecting the said signal to the control input of the sampler;

whereby the said signal controls the sampler to permit passage of a new offset value to the said controllable delay means only when there is a single occurrence of a correlation offset across the bitstreams at any given instant.

14. A system according to claim 1, further comprising a further multiplexer connected to the said path so as to insert message signals into the path.

15. A system according to claim 14, wherein said further multiplexer transmits said message signals by modulation of the reference bitstream.

16. A system according to claim 14, wherein said further multiplexer is a time division multiplexer connected downstream of the multiplexer used to form the said reference bitstream, whereby to multiplex the message signals with the reference bitstream.

17. A system according to claim 14, wherein said further multiplexer is connected to a direct output of said multiplexer used to form the said reference bitstream and to an inverted output from said multiplexer, and a source of message signals is connected to said further multiplexer such that message signals are sent by selective transmission of the direct or the inverted versions of the output from said multiplexer.

18. A system according to claim 14, said further multiplexer comprising:

a first time division multiplexer connected to an inverted version of said data bitstreams;

a second time division multiplexer connected to a direct version of said data bitstreams;

and wherein outputs from said first and second time division multiplexers are connected to the input of said multiplexer used to form the said reference bitstream, whereby to multiplex the message signal with the inverted version of the data bitstreams.

19. A system according to claim 1, further comprising a predictor connected to said comparator and arranged, in response to a signal derived from said comparator, corresponding to a sampling sequence used to form the said reference bitstream, to predict that bitstream which next correlates best with said reference bitstream.

20. A system according to claim 19, further comprising means to signal a fault condition when the predicted bitstream does not correlate as expected.

21. A system according to claim 20, wherein the said path comprises an optical fibre and a laser arranged to insert data bitstreams into said path, and further comprising a control device arranged to shut down said laser in response to the generation of a fault condition.

22. A method of detecting skew between n digital data bitstreams relative to one another, the method comprising;

arranging said digital data into n parallel bitstreams;

sampling bursts of data from said n parallel bitstreams according to a sampling sequence to form a reference bitstream;

inserting said n bitstreams and said reference bitstream into a signal path;

retrieving said n bitstreams and said reference bitstream from said signal path; and comparing the retrieved reference bitstream with said n parallel data bitstreams in order to produce outputs indicative of the offset of each of said n parallel bitstreams relative to said reference bitstream.

23. A method according to claim 22, wherein said comparing step comprises correlating said reference bitstream and said data bitstreams over a plurality of spaced time intervals.

24. A method according to claim 22, further comprising correcting the skew of said n parallel data bitstreams in accordance with said offset indicative outputs.

25. A method according to claim 22, further comprising scrambling the bitstreams prior to insertion into said path and descrambling the bitstreams after recovery from said path.

26. A method according to claim 23 wherein the correlating step comprises:

passing the n parallel data bitstreams and the reference bitstream through an input FIFO buffer; and correlating recovered time-spaced samples of the data bitstreams passing through the input buffer with the reference bitstream passing through the input buffer, whereby to produce outputs indicative of the offset of the reference bitstream and the data bitstreams.

27. A method according to claim 26, further comprising the step of adjusting the relative timing between data bitstreams in accordance with said offset outputs of the correlator by means of a controllable delay device, whereby to correct skew between the data bitstreams.

28. A method according to claim 27, further comprising:

passing said offset outputs of the correlator to a control input of the said controllable delay device through a controllable sampler;

extracting from the correlator a signal corresponding to the sample sequence used to form the reference bitstream; and only permitting passage of a new offset value to the said controllable delay means when there is a single occurrence of a correlation offset across the bitstreams at any given instant.

29. A method according to claim 22, further comprising sending signalling messages over the said path.

30. A method according to claim 22, wherein said signalling is effected by connecting a message signal to an input of a time division multiplexer connected to the said multiplexer used to form the said reference bitstream, whereby to multiplex the message signal with the reference bitstream.

31. A method according to claim 22, wherein said signalling is effected by connecting a message signal to an input of a time division multiplexer connected to a direct output from the output of said multiplexer used to form the said reference bitstream and to an inverted output from said multiplexer, whereby to multiplex the message signal by selective transmission of the direct or the inverted versions of the output from the multiplexer.

32. A method according to claim 22, wherein said signalling is effected by:
  a first time division multiplexer connected to an inverted version of said data bitstreams;
  a second time division multiplexer connected to a direct version of said data bitstreams;
  connecting the outputs from the first and second time division multiplexers to the input of said multiplexer used to form the said reference bitstream; and
  connecting a message signal to an input of said first time division multiplexer, whereby to multiplex the message signal with the inverted version of the data bitstreams.

33. A method according to claim 22, further comprising connecting a predictor to said comparator so as, in response to a signal derived from said comparator, corresponding to said sampling sequence used to form the said reference bitstream, to predict the data bitstream which next correlates best with said reference bitstream.

34. A method according to claim 31, further comprising signalling a fault condition when the predicted bitstream does not correlate as expected.

35. A method according to claim 22, wherein the path comprises an optical fibre and a laser arranged to insert data bitstreams into said path, and further comprising the step of shutting down said laser in response to the generation of a fault condition in the said path.

36. A digital data transmitter adapted to detect skew between n parallel digital data streams relative to one another, the transmitter comprising:
  a multiplexer arranged to sample bursts of data from said n parallel bitstreams according to a sampling sequence to form a reference bitstream; and
  a driver arranged to insert said n parallel bitstreams and said reference bitstream into a signal path.

37. A digital data transmitter according to claim 36, further comprising a controllable delay device responsive to signals retrieved from the said path indicative of the offsets of each of said data bitstreams relative to said reference bitstream, whereby to adjust the relative timing between data bitstreams so as to correct skew.

38. A digital data transmitter according to claim 36, further comprising a correlator arranged to correlate the data bitstreams with the reference bitstream recovered from the signal path so as to produce offset outputs indicative of the offset of each of said data bitstreams relative to said reference bitstream.

39. A digital data transmitter according to claim 38, further comprising a controllable delay device responsive to said offset indicative outputs whereby to adjust the relative timing between data bitstreams so as to correct the detected skew.

40. A digital data receiver for n parallel data bitstreams received over a signal path, said receiver incorporating means arranged to detect skew between said n digital data streams relative to one another, comprising:
  a receiver arranged to retrieve from said path said n parallel data bitstreams and a reference bitstream, said reference bitstream comprising sampled bursts of data from said n parallel bitstreams according to a sampling sequence;
  an extractor arranged to recover said reference bitstream; and
  a comparator arranged to compare said extracted reference bitstream with said n received parallel data bitstreams in order to produce outputs indicative of the offset of each of said parallel bitstreams relative to said reference bitstreams.

41. A digital data receiver according to claim 40, further comprising a driver arranged to insert into said path, for reverse transmission to a transmit side of the said path, a signal representing the offset indicative outputs of the said comparator.

42. A receiver according to claim 40, further comprising a corrector arranged to correct skew between said n parallel data bitstreams in accordance with said offset indicative outputs.

43. A receiver according to claim 40 wherein the comparator comprises a correlator to correlate the data bitstreams with the reference bitstream over a plurality of spaced time intervals.

44. A method of transmitting digital data over a signal path in such a way as to enable detection of skew between digital data bitstreams relative to one another, the method comprising;
  arranging said digital data into n parallel digital data bitstreams;
  sampling bursts of data from said n parallel bitstreams according to a sampling sequence to form a reference bitstream; and
  inserting said n bitstreams and said reference bitstream into said signal path.

45. A method of receiving digital data from a signal path in such a way as to enable detection of skew between n parallel digital data bitstreams relative to one another, the transmitted data comprising said n parallel digital data bitstreams and a reference bitstream comprising sampled bursts of data from said n parallel bitstreams according to a sampling sequence, the method comprising:
  retrieving said n parallel data bitstreams and said reference bitstream from said signal path;
  extracting said reference bitstream; and
  comparing said extracted reference bitstream with said n received parallel data bitstreams in order to produce outputs indicative of the offset of each said data bitstream relative to said reference bitstream.

46. A method according to claim 45, further comprising correcting skew between said n parallel data bitstreams in accordance with said offset indicative outputs.

47. A method according to claim 45, further comprising transmitting said offset indicative outputs to a transmit side of said signal path.

48. A digital signal comprising a plurality of n digital data bitstreams and a reference bitstream, said reference bitstream comprising a series of bursts of samples from said n data bitstreams, whereby skew between the data bitstreams may be detected.

49. A digital signal comprising a plurality of n digital data bitstreams that have been corrected for skew by a method comprising the steps of:

arranging a source of digital data into n parallel bitstreams;

sampling bursts of data from said n parallel bitstreams according to a sampling sequence to form a reference bitstream;

inserting said n bitstreams and said reference bitstream into a signal path;

retrieving said n data bitstreams and said reference bitstream from said signal path;

extracting said reference bitstream; and comparing said extracted reference bitstream with said n received parallel data bitstreams in order to produce outputs indicative of the offset of each said bitstream relative to said reference bitstream.

50. A digital signal comprising a plurality of n parallel data bitstreams that have been corrected for skew by a digital data transmission system, the system comprising;

a multiplexer arranged to sample bursts of data from said n parallel data bitstreams to form a reference bitstream;

a driver arranged to insert said n parallel data bitstreams and said reference bitstream into a signal path;

a receiver arranged to retrieve said reference bitstream and said data bitstreams from said signal path;

a comparator arranged to compare the recovered reference bitstream with the received parallel data bitstreams in order to produce outputs indicative of the offset of each of said parallel data bitstreams relative to said reference bitstream; and an adjustable delay device arranged to adjust the relative timing between said data bitstreams in accordance with said offset indicative outputs.

51. A digital signal comprising a plurality of n parallel data bitstreams that have been corrected for skew resulting from passage over a signal path of n parallel data bitstreams and a reference bitstream, said reference bitstream comprising sampled bursts of data from said n parallel data bitstreams according to a sampling sequence, skew having been corrected by a method of receiving transmitted-data comprising:

retrieving said n parallel data bitstreams and said reference bitstream from said signal path;

extracting said reference bitstream;

comparing said extracted reference bitstream with said n retrieved parallel data bitstreams in order to produce outputs indicative of the offset of each said data bitstream relative to said reference bitstream; and correcting the skew between said n parallel data bitstreams in accordance with said offset indicative outputs.

52. A digital data signal comprising n parallel data bitstreams and a reference bitstream comprising sampled bursts of said n parallel data bitstreams according to a sampling sequence.

53. A signal path carrying a digital data signal according to claim 52.

54. A digital data communication system incorporating means to detect skew between n parallel digital data bitstreams relative to one another, the system comprising a transmit side and a receive side, the said receive side comprising:
a multiplexer arranged to sample bursts of data from said n parallel bitstreams according to a sampling sequence to form a reference bitstream;
a driver arranged to insert said reference bitstream into a signal path for reverse transmission to the transmit side;

the said transmit side comprising:
a reference bitstream extractor arranged to recover the reference bitstream from the signal path; and
a comparator arranged to compare said extracted reference bitstream with said n parallel data bitstreams to produce outputs indicative of the offset of each of said n parallel bitstreams relative to said reference bitstream.

55. A digital data communication system according to claim 54 and further comprising a corrector to correct skew between said n parallel data bitstreams in accordance with said offset indicative outputs.

56. A digital data communication system according to claim 54, wherein said receive side further comprises a phase detector to detect the phase difference between the data bitstreams and a reference clock.

57. A digital data communication system according to claim 56, wherein said receive side further comprises a modulator to modulate said reference bitstream to indicate to the transmit side any detected phase error.

58. A digital data communication system according to claim 57, wherein said modulator comprises a multiplexer arranged to transmit selectively a direct or an inverted version of the reference bitstream.

59. A digital data communication system according to claim 54, wherein said transmit side further comprises a transmitter arranged to insert said n parallel data bitstreams into said signal path, said transmitter further being controlled so as to minimise fractional skew.

60. A digital data communication system according to claim 59, wherein said transmitter on said transmit side is controlled in accordance with error signals derived from a comparison of the relative phase between a reference clock and error signals output from a comparator arranged to detect skew between the n parallel data bitstreams and the said reference bitstream.

61. A digital data communication system according to claim 57, wherein said phase detector at said receive side is arranged to indicate three phase states in which the reference clock is (i) in advance of or (ii) lags the data bitstream or (iii) the phase angle is unknown.

62. A digital data communication system according to claim 61, wherein said phase detector at the receive side is arranged to suppress passage of output signals indicating either the first or the second phase states when the third phase state exists.

63. A digital data communication system according to claim 62, wherein said phase detector at the receive side is arranged to send an alternating signal when the third phase state exists.

64. A digital data communication system according to claim 1, wherein said multiplexer further comprises a comparator arranged to determine whether correlation exists between the sample burst of data currently being transmitted and the sample burst of data to be transmitted next.

65. A digital data communication system according to claim 64, wherein said last mentioned comparator is arranged to substitute a different sampling sequence when it is determined that said correlation exists, so as to avoid false skew detection.

66. A digital data communication transmitter, comprising:
a driver arranged to insert into a signal path n parallel digital data bitstreams;
a reference bitstream extractor arranged to extract a reference bitstream from said signal path, said reference bitstream comprising sample bursts of data from said n parallel data bitstreams;

a comparator arranged to compare said extracted reference bitstream with said n parallel data bitstreams to produce outputs indicative of the offset of each of said n parallel data bitstreams relative to said reference bitstream.

67. A digital data communication receiver arranged to receive n parallel digital data bitstreams over a signal path, said receiver further comprising:

a multiplexer arranged to sample bursts of data from said n parallel digital data bitstreams according to a sampling sequence to form a reference bitstream; and a driver arranged to insert said reference bitstream into said signal path for reverse transmission to a transmit side of the signal path.

* * * * *